United States Patent [19]
Inoue et al.

[11] Patent Number: 5,117,470
[45] Date of Patent: May 26, 1992

[54] GUIDED-WAVE OPTICAL CIRCUIT AND METHOD FOR ADJUSTING A CHARACTERISTIC THEREOF

[75] Inventors: Yasuyuki Inoue; Masayuki Okuno; Masao Kawachi, all of Mito, Japan

[73] Assignee: Nippon Telegraph and Telephone Corporation, Tokyo, Japan

[21] Appl. No.: 661,322

[22] Filed: Feb. 21, 1991

[30] Foreign Application Priority Data

Feb. 26, 1990 [JP] Japan .................................. 2-42538
Jul. 9, 1990 [JP] Japan .................................. 2-179467

[51] Int. Cl.⁵ .............................................. G02B 6/12
[52] U.S. Cl. ........................................ 385/14; 385/1; 385/122
[58] Field of Search ...................... 350/96.11, 96.29

[56] References Cited

FOREIGN PATENT DOCUMENTS 2180667  4/1987  United Kingdom .

OTHER PUBLICATIONS

Ourmazd, et al.; "Thermal Properties of Highly Birefringent Optical Fibers and Preforms"; *Applied Optics*, vol. 22, No. 15; Aug. 1983, pp. 2375-2379.

"Annealing of 517.645 Borosilicate Optical Glass: 1, Refractive Index", Neill M. Brandt, Journal of the American Ceramic Society, vol. 34, No. 11, Nov. 1951, pp. 332-338.

"Silica-Based Single-Mode Waveguides on Silicon and their Application to Guided-Wave Optical Interferometer", Norio Takato, Kaname Jinguji, Mitsuho Yasu, Hiromu Toba, and Masao Kawachi, Journal of Lightwave Technology, vol. 6, No. 6, Jun. 1988, pp. 1003-1009.

"Low-Loss High-Silica Single-Mode Channel Waveguides", N. Takato, M. Yasu, M. Kawachi, Electronics Letters, Mar. 13, 1986.

"Type Mach-Zehnder Multi/Demultiplexers", H. Uetsuka, M. Kurosawa, K. Imoto, Electronics Letters, Feb. 15, 1990, vol. 26, No. 4, pp. 251-253.

"Properties and Structure of Vitreous Silica. I", R. Bruckner, Journal on Non-Crystalline, pp. 123-175.

*Primary Examiner*—William L. Sikes
*Assistant Examiner*—Robert E. Wise
*Attorney, Agent, or Firm*—Kenyon & Kenyon

[57] ABSTRACT

A method for adjusting a characteristic of a guided-wave optical circuit which includes one or more waveguides formed by a substrate, a cladding layer formed on the substrate, and a core portion having one or more cores embedded in the cladding layer. The method is carried out by producing a reversible thermal hysteresis phenomenon, after the clading layer and core portion have been formed. The thermal hysteresis phenomenon is produced in a thermal hysteresis produced region preselected so as to include at least a portion of the cladding layer and/or the core portion, thereby adjusting a refractive index difference between the cladding layer and the core portion. To produce a reversible thermal hysteresis phenomenon, the following steps are carried out: raising the temperature of the thermal hysteresis produced region to a predetermined temperature; maintaining the predetermined temperature of the thermal hysteresis produced region for a predetermined time period; and cooling the thermal hysteresis produced region at a predetermined cooling rate. At least one of the values of the predetermined temperature, predetermined time period, and predetermined cooling rate is controlled so that the refractive index difference between the cladding layer and the core portion is adjusted to a desired value, thereby adjusting the characteristic of the guided-wave optical circuit.

27 Claims, 29 Drawing Sheets

DRIVING POWER OF THE THIN FILM HEATER PHASE SHIFTER (W)

GUIDED-WAVE OPTICAL CIRCUIT AND METHOD FOR ADJUSTING A CHARACTERISTIC THEREOF

BACKGROUND OF THE INVENTION

1. Field of the Invention

The present invention relates to a guided-wave optical circuit and method for adjusting a characteristic of the guided-wave optical circuit disposed on a substrate, in which the coupling ratio of a directional coupler or an optical path length of a guided-wave optical circuit is adjusted by changing their refractive indices by using a thermal hysteresis phenomenon of a material constituting the guided-wave optical circuit.

2. Description of the Prior Art

Single-mode optical waveguides fabricated on a plane substrate, in particular, silica-based single mode waveguides which are fabricated on a silicon substrate or silica grass substrate are expected as a promising means for implementing practical guided-wave optical devices (guided-wave optical circuits) which are superior in matching with optical fibers. This is because diameters of the silica-based single mode waveguides can be made about 5-10 μm, which match common sizes of sectional areas of the cores of single-mode optical fibers (for example, see N. Takato, et al. "Silica-Based Single-Mode Waveguides on Silicon and Their Application to Guided-Wave Optical Interferometers, Journal of Lightwave Technology", Vol. 6, No. 6, June 1988, pp. 1003-1010, or Masao Kawachi, "Silica-based optical waveguides and their application to integrated optical devices", Optics 18, (1989), pp. 681-686.

CONVENTIONAL EXAMPLE 1

FIGS. 1 and 2 are a perspective view and an enlarged sectional view taken along line A—A′ of FIG. 1, respectively, for explaining an arrangement of a conventional directional coupler as an example of the most basic guided-wave optical circuit using a silica-based single-mode optical waveguide of the above-mentioned type. Silica-based single-mode optical waveguides 1 and 2 are placed side by side in close proximity at a part thereof so that a directional coupler 5 is constructed.

The optical waveguides 1 and 2 are composed of $SiO_2$-$TiO_2$ or $SiO_2$-$GeO_2$ based glass cores: each core is embedded in $SiO_2$ based glass cladding layers 7 and 8 of about 50 μm thickness formed on a substrate 9, and has cross sectional dimensions of about 7×7 μm. In the directional coupler 5, the two optical waveguides 1 and 2 are spaced a few μm apart, and are placed in parallel over about 500 μm length. A part of a light signal incident onto an input port 1a and transmitted through the optical waveguide 1 transfers to the adjacent optical waveguide 2 at the portion of the directional coupler 5, and thus light beams are emitted from output ports 1b and 2b. In FIG. 1, reference numerals 1a′, 1b′ and 2b′ denote an input fiber, and output fibers, respectively, and reference characters $P_1$ and $P_2$ designate the intensity of light signals emitted from the output ports 1b and 2b, respectively.

The coupling ratio C of the directional coupler 5 is defined by the following expression:

$$C = P_2/(P_1 + P_2)$$

To obtain a desired coupling ratio (50%, for example), the space between or the coupling length of the two optical waveguides 1 and 2 at the coupling portion must be set accurately.

CONVENTIONAL EXAMPLE 2

FIGS. 3 and 4 are a perspective view and an enlarged sectional view taken along line A—A′ of FIG. 3, respectively, for explaining an arrangement of a conventional polarization beam splitter as an example of a guided-wave optical circuit constructed by integrating two directional couplers on a substrate.

In FIGS. 3 and 4, silica-based single-mode optical waveguides 1 and 2 are formed on a silicon substrate 9 by using silica based glass as a material. The optical waveguides are placed in close proximity at two locations so that directional couplers 5 and 6 are constructed. The coupling ratios of the two couplers are designed to take a value of 50%.

The optical waveguides 1 and 2 are composed of a $SiO_2$-$TiO_2$ or $SiO_2$-$GeO_2$ based glass cores: each core is embedded in $SiO_2$ based glass cladding layers 7 and 8 of about 50 μm thickness, and has cross sectional dimensions of about 7×7 μm. In the directional couplers 5 and 6, the two optical waveguides 1 and 2 are spaced a few μm apart, and are placed in parallel over about 500 μm length. Here, the two directional couplers 5 and 6 are connected through the optical waveguides, and can be considered as constituting a kind of Mach-Zehnder interferometer. The lengths of the two waveguides connecting the two directional couplers 5 and 6 are set equal, and a stress applying film 22 made of amorphous silicon (a-Si) is disposed on the surface of the over cladding layer 7 on the waveguide 1. On the other waveguide 2, a thin film phase shifter 10 is disposed. In FIG. 3, a reference numeral 21 denotes a trace left by trimming a part of the a-Si stress applying film 22 by using an energy beam.

A method to control the birefringence values and optical path lengths of the waveguides 1 and 2 by controlling the stress applying film 22 and the thin film heater phase shifter 10 is proposed by Japanese Patent Application Laying-Open No. 64-77002: for example, it proposes a method for adjusting the birefringence value and the optical path length so that the optical path length difference between the two waveguides connecting the directional couplers 5 and 6 becomes nλ for a TE mode light beam, and becomes $(m+\frac{1}{2})\lambda$ for a TM mode light beam, where n and m are integers and λ is a wavelength of the light beam.

In this polarization beam splitter, a TE mode light signal incident onto an input port 1a is emitted from an output port 1b, and a TM mode light signal incident onto the input port 1a is emitted from an output port 2b. In FIG. 3, reference numerals 1a′, 1b′ and 2b′ designate an input fiber and output fibers, respectively.

FIG. 5 illustrates the behavior of outputs from the output ports 1b and 2b when the TE and TM mode light signals are supplied to the input port 1a with an identical power, and when the driving power of the thin film heater phase shifter 10 is varied. Here, the solid line shows the output power $P_1$ from the output port 1b, and the broken line shows the output power $P_2$ from the output port 2b. FIG. 5 shows that the polarization beam splitter operation is achieved when the driving power of the thin film heater phase shifter 10 is W1 or W2.

The coupling ratio of the directional coupler in the first conventional example is set by controlling a precise mask pattern in the fabrication process of guided-wave optical circuits based on a so-called photolithography process. Achieving the exact coupling ratio of a desired value, however, is extremely difficult: for example, in the present state of the art, even if the coupling ratio of 50% is intended, actual coupling ratios of the directional couplers fall in the range of about 50±5% when the fabrication process of the guided-wave optical circuits has been finished. This is because the directional couplers are very sensitive to the structure thereof: the coupling ratios thereof sensitively depends not only on the space between the optical waveguides or the coupling length, but also on the refractive index difference between the cores of the optical waveguides 1 and 2 and the cladding layers 7 and 8 surrounding the cores.

In the second conventional example, on the other hand, if the coupling ratios of the two directional couplers are exactly 50%, the TE mode and TM mode waves can be completely separated by adjusting the birefringences and the optical path lengths of the waveguides, and hence the two waves are emitted from the different output ports. Achieving the exact coupling ratio of 50%, however, is extremely difficult for the reasons mentioned above: in the present state of the art, even if the coupling ratio of 50% is intended, actual coupling ratios of the directional couplers fall in the range of about 50±5% when the fabrication process of the guided-wave optical circuits has been finished because of the limit of fabrication precision of guided-wave optical circuits, or of the slight fluctuation of refractive indices of optical waveguide glass. As a result, to obtain polarization beam splitters of low crosstalk with a high yield, the coupling ratios of the directional couplers must undergo fine adjustment after the guided-wave optical circuits have been fabricated.

In addition, although the polarization beam splitter is fundamentally a passive element, the splitter operation must be maintained by continually supplying power to the thin film heater phase shifter 10 as shown in FIG. 5 so that the optical path length difference between the two waveguides connecting the two directional couplers is correctly maintained, which is practically unpreferable.

SUMMARY OF THE INVENTION

Accordingly, it is an object of the present invention to provide a guided-wave optical circuit and method for adjusting a characteristic thereof, which can eliminate the above-described two disadvantages associated with the conventional techniques to precisely control the coupling ratio and optical path length in such guided-wave optical circuits.

The foregoing and other purposes of the present invention can effectively be achieved by providing a method for adjusting a guided-wave optical circuit which comprises the step of:
producing a reversible thermal hysteresis phenomenon, after the cladding layer and core portion have been formed, in a thermal hysteresis produced region preselected so as to include at least a portion of the cladding layer and/or the core portion, thereby adjusting a refractive index difference between the cladding layer and the core portion; the step of producing a reversible thermal hysteresis comprising the steps of:
raising the temperature of the thermal hysteresis produced region to a predetermined temperature;
maintaining the predetermined temperature of the thermal hysteresis produced region for a predetermined time period; and
cooling the thermal hysteresis produced region at a predetermined cooling rate,
wherein at least one of the values of the predetermined temperature, predetermined time period, and predetermined cooling rate is controlled so that the refractive index difference between the cladding layer and the core portion is adjusted to a desired value, thereby adjusting the characteristic of the guided-wave optical circuit.

Here, the predetermined cooling rate may be determined at a greater value than a refractive index maintaining cooling rate at which the difference of the refractive indices between the cladding layer and core portion is maintained before and after the thermal hysteresis phenomenon.

The step of producing a reversible thermal hysteresis phenomenon may be carried out to change a coupling ratio between the waveguides of the guided-wave optical circuit.

The guided-wave optical circuit may be a directional coupler.

The step of producing a reversible thermal hysteresis phenomenon may be carried out to change an optical path length of at least one of the waveguides of the guided-wave optical circuit.

The guided-wave optical circuit may be an optical interferometer.

The thermal hysteresis produced region may include the substrate, the cladding layer and the core portion, and the step of producing a reversible thermal hysteresis phenomenon may be carried out at the same time to all the guided-wave optical circuits which have been formed on the substrate, thereby to adjust the characteristic of all the guided-wave optical circuits on the substrate.

The thermal hysteresis produced region may be a portion of the cladding layer and/or of the core portion.

The step of producing a reversible thermal hysteresis phenomenon may be carried out by irradiating the thermal hysteresis produced region by an energy beam.

The step of producing a reversible thermal hysteresis phenomenon may be carried out by using a heater for heating the thermal hysteresis produced region.

The step of producing a reversible thermal hysteresis phenomenon may be repeated a plurality of times to adjust the characteristic of the guided-wave optical circuits.

The step of producing a reversible thermal hysteresis phenomenon may be carried out to the cladding layer and the core portion which have different dopant concentrations, so that thermal expansion coefficients of the cladding layer and the cores of the core portion differ each other.

The cladding layer may have greater dopant concentration than the core portion.

The core portion may have greater dopant concentration than the cladding layer.

According to another aspect of the present invention, there is provided a guided-wave optical circuit comprising:
one or more waveguides formed by a substrate, a cladding layer formed on the substrate, and a core portion having one or more cores embedded in the cladding layer; and a thermal hysteresis produced region which is preselected so as to include at least a portion of the cladding layer and/or the core portion, and in which a refractive index difference between the cladding layer and core portion has been adjusted by using a reversible thermal hysteresis phenomenon so that the refractive index difference in the thermal hysteresis produced region differs from that of a region other than the thermal hysteresis produced region.

According to still another aspect of the present invention, there is provided a guided-wave optical circuit comprising:

one or more waveguides formed by a substrate, a cladding layer formed on the substrate, and a core portion having one or more cores embedded in the cladding layer;

a thermal hysteresis produced region which is preselected so as to include at least a portion of the cladding layer and/or the core portion, and in which a refractive index difference between the cladding layer and core portion has been adjusted by using a reversible thermal hysteresis phenomenon so that the refractive index difference in the thermal hysteresis produced region differs from that of a region other than the thermal hysteresis produced region; and means for producing the reversible thermal hysteresis phenomenon in the thermal hysteresis produced region after the cladding layer and core portion have been formed, thereby adjusting the refractive index difference.

Here, the guided-wave optical circuit may include a directional coupler, and the means for producing the reversible thermal hysteresis phenomenon may be one or more heaters, each of which is disposed in the vicinity of the directional coupler, for changing the coupling ratio of the directional coupler.

One or more heaters may be covered by a protective film.

The substrate may have a heat insulating groove for preventing heat developed by the heaters from dispersing.

The means for producing the reversible thermal hysteresis phenomenon may be one or more heaters disposed on the cladding layer for heating the thermal hysteresis produced region, thereby to change an optical path length of at least one of the waveguides of the guided-wave optical circuit.

The guided-wave optical circuit may include a plurality of directional couplers and waveguides connecting the directional couplers, and one or more heaters may be disposed in the vicinity of at least one of the waveguides.

The guided-wave optical circuit may further have a stress applying film disposed in the vicinity of at least one of the waveguides for exerting a stress on the waveguide.

The waveguides connecting the directional couplers may have different optical path lengths, and each of the heaters may be disposed in the vicinity of each respective one of the waveguides.

The waveguides connecting the directional couplers may have the same optical path length, and each of said heaters may be disposed in the vicinity of each respective one of the waveguides.

The guided-wave optical circuit may include a plurality of directional couplers and waveguides connecting the directional couplers, the directional couplers and waveguides being arranged into an optical multiplexer, and the one or more heaters may be disposed in the vicinity of the waveguides.

The cladding layer may consist of an over cladding layer and an under cladding layer, and the over cladding layer may have greater dopant concentration than the under cladding layer and the core portion.

The cladding layer may consist of an over cladding layer and an under cladding layer, and the core portion may have greater dopant concentration than the over cladding layer and the under cladding layer.

According to the present invention, the coupling ratio of a directional coupler, which is arranged by placing two optical waveguides in close proximity, can be accurately adjusted to a desired value (50%±1%, for example) after a guide-wave optical circuit including the directional coupler has been formed. The method for adjusting the coupling ratio of the directional coupler will greatly contribute to the fabrication of practical guided-wave optical circuits because the directional coupler is one of the most promising type of devices: a directional coupler is not only used as an optical multiplexer or optical power splitter, but also is an essential element to construct more complex integrated optical devices by integrating a plurality of directional couplers on a substrate. As an example of the application of the directional coupler, the guided-wave type polarization beam splitter according to the present invention can maintain a crosstalk value of less than −30 dB, which was conventionally around −20 dB in general.

Furthermore, according to the present invention, the optical path length of an optical waveguide can be adjusted at a desired portion thereof after the guided-wave optical circuit including the waveguide has been formed. As an example of this, control of the optical path length of the guided-wave type polarization beam splitter, which is conventionally carried out by using the thin film heater phase shifter, can be replaced by the method of the present invention. As a result, continuous power supply to the polarization beam splitter becomes unnecessary.

The method of the present invention is reversible because the thermal hysteresis phenomenon of materials constituting the cladding layer or core is used. Accordingly, the once changed coupling ratio or optical path length can be returned to its original value if necessary. This reversibility facilitates the adjustment of characteristics of the guided-wave optical circuits, thus enabling novel guided-wave optical circuits to be implemented.

The method for finely adjusting the optical path length according to the present invention is expected to contribute to improve the characteristics of integrated optical devices or to create novel types of optical devices. As examples of the integrate optical devices, there are devices using the principle of interference, such as wavelength independent couplers, optical switches, optical frequency-division multi/demultiplexing devices, or the like.

A local heating method of the present invention by heat-resistant heaters can lessen the requisite for accuracy of the fabrication and packaging of optical integrated circuits because the adjustment can be carried out with the input and output optical fibers connected to the devices after the devices have been fabricated. Thus, it can achieve optical devices of desired characteristics with high yields.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

The invention will now be described with reference to the accompanying drawings.

EMBODIMENT 1

First, as a first embodiment of the present invention, a directional coupler composed of a silica-based single-mode optical waveguide on a silicon substrate, and a method for adjusting the coupling ratio thereof will be described.

Figure 1:
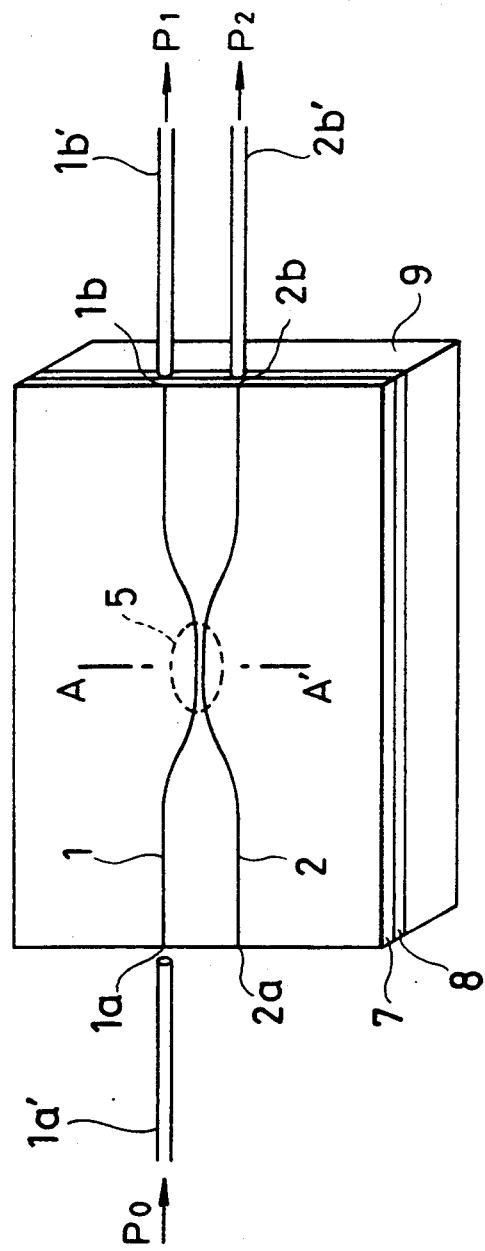
FIGS. 1 and 2 are a perspective view and an enlarged sectional view taken along line A—A' of FIG. 1, respectively, showing an arrangement of a conventional directional coupler as an example of the most basic guided-wave optical circuit using a silica-based single-mode optical waveguides.
Figure 2:
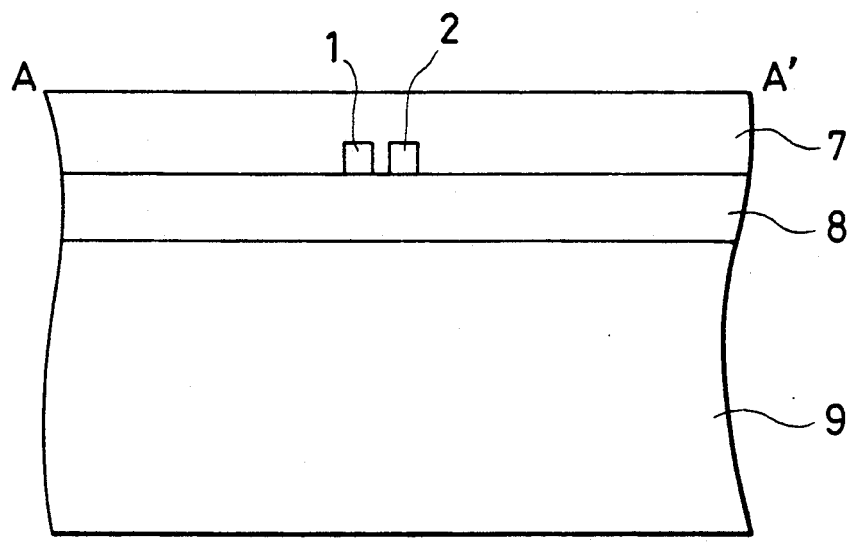
Figure 3:
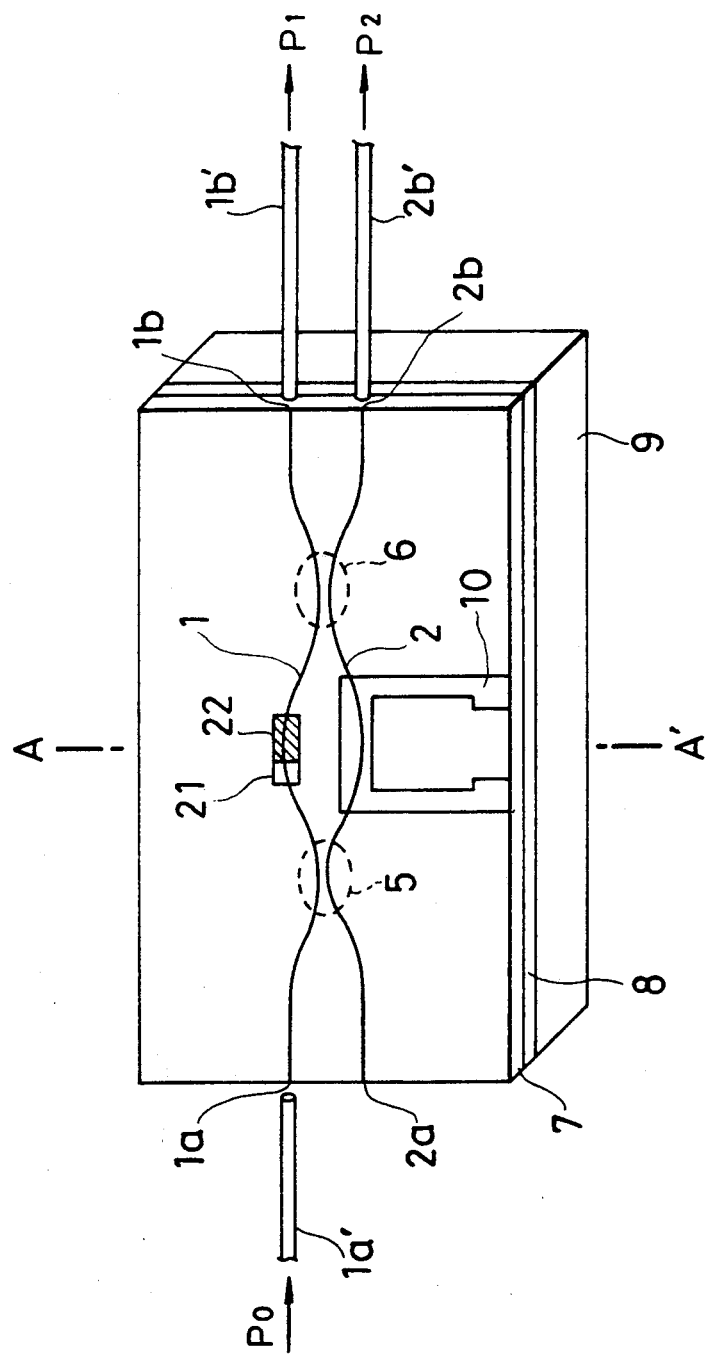
FIGS. 3 and 4 are a perspective view and an enlarged sectional view taken along line A—A' of FIG. 3, respectively, showing an arrangement of a conventional guided-wave polarization beam splitter as an example of a guided-wave optical circuit constructed by integrating two directional couplers on a substrate.
Figure 4:
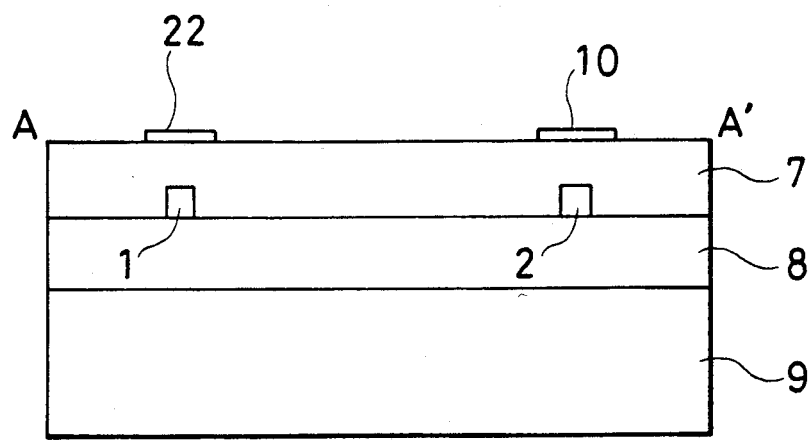
Figure 5:
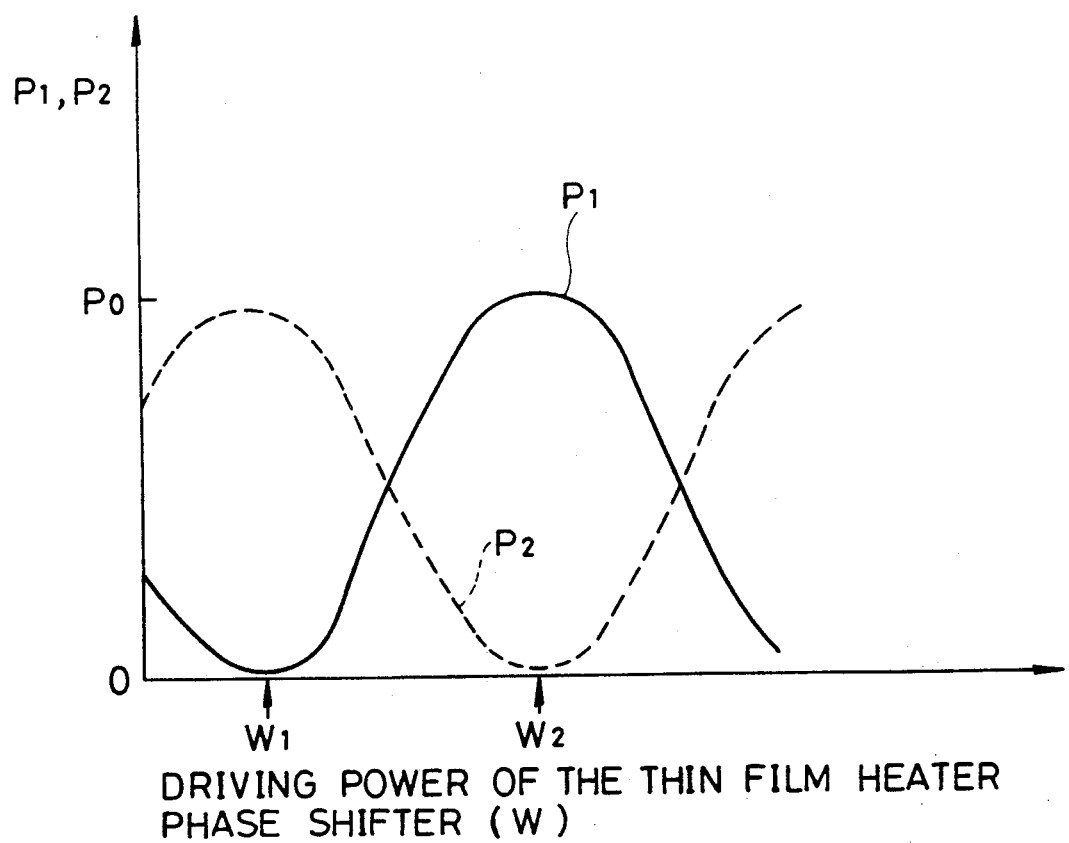
FIG. 5 is a diagram illustrating the characteristics of the guided-wave polarization beam splitter of FIG. 4.

Although the appearance of the directional coupler used by the present embodiment is identical to that of the conventional directional coupler shown in FIGS. 1 and 2, it distinctly differs from the conventional one in that the over cladding layer 7 includes a large quantity of dopant (B (boron), and P (phosphorus)). FIGS. 6A-6E are views for explaining the fabrication process of such a directional coupler.

Figure 6A:
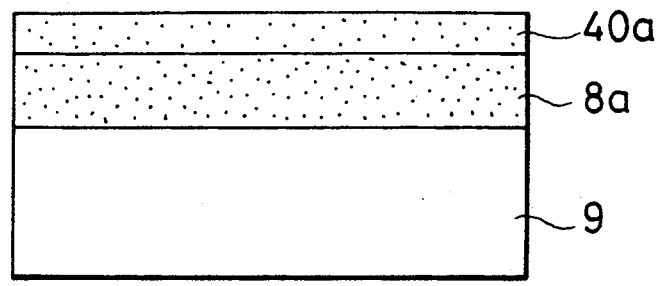
FIGS. 6A–6E are corss sectional views for explaining, as a first embodiment of the present invention, the fabrication process of a directional coupler sample the coupling ratio of which is adjusted by the thermal hysteresis method using an electric furnace.
Figure 6B:
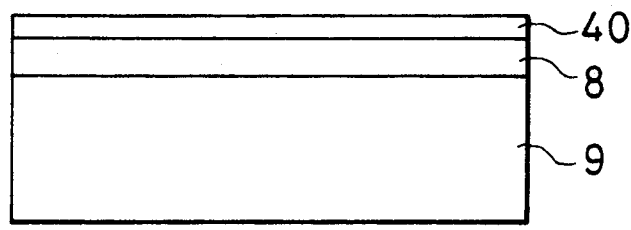
Figure 6C:
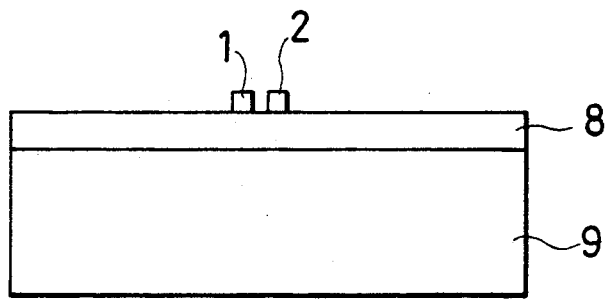
Figure 6D:
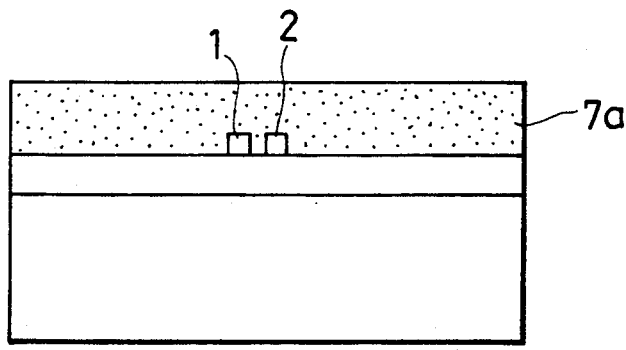
Figure 6E:
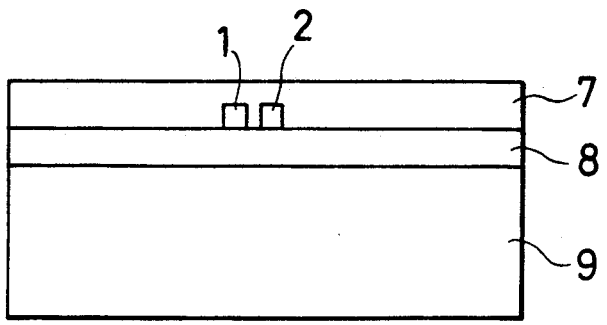

First, a fine glass particle layer 8a for under cladding layer 8 mainly composed of $SiO_2$ is deposited on a silicon layer 9 by a flame hydrolysis reaction of a gas mixture mainly composed of $SiCl_4$ with containing a small quantity of $BCl_3$ and $PCl_3$. Subsequently, the gas mixture is switched to that composed of that gas mixture plus an appropriate quantity of $TiCl_4$, and a fine glass particle layer 40a for cores 1 and 2 mainly composed of $SiO_2$-$TiO_2$ is deposited (FIG. 6A). After that, the silicon substrate 9 on which two glass layers 8a and 40a are deposited is heated at about 1,350° C. in an electric furnace so that the fine glass particle layers are vitrified into transparent glass, thereby forming under cladding layer 8 and the core layer 40 (FIG. 6B). Subsequently, unnecessary portions of the core layer 40 are removed by a reactive ion etching process to form cores 1 and 2 (FIG. 6C). Next, a fine glass particle layer 7a containing a large quantity of dopant (B and P) for an over cladding layer 7 is deposited so that the cores 1 and 2 are embedded therein by using again a flame hydrolysis reaction of a gas mixture of $SiCl_4$-$BCl_3$-$PCl_3$ (FIG. 6D). After that, the substrate 9 is heated again at about 1,250° C. in the electric furnace so that the fine glass particle layer 7a is vitrified into transparent glass, that is, the over cladding layer 7. Then, the substrate is cooled slowly to near the room temperature at a rate of about $-10^{-2}°$ C./sec so that a desired sample of the directional coupler is fabricated (FIG. 6E).

The composition of the glass thus formed is as follows: the under cladding layer and cores 1 and 2 contain $P_2O_5$ and $B_2O_3$ the sum total of which is about 4 mol % when the raw material gas is composed; and the over cladding layer 7 contains $P_2O_5$ and $B_2O_3$ the sum total of which is about 12 mol % when the raw material gas is composed. The refractive index of the over cladding layer 7 and that of the under cladding layer 8 are made nearly equal by adjusting the dopant concentration thereof. It is a matter of course that an appropriate quantity of $TiO_2$ or $GeO_2$ is added to the cores 1 and 2 to increase the refractive index of the cores so as to accomplish the light transmission.

Figure 7:
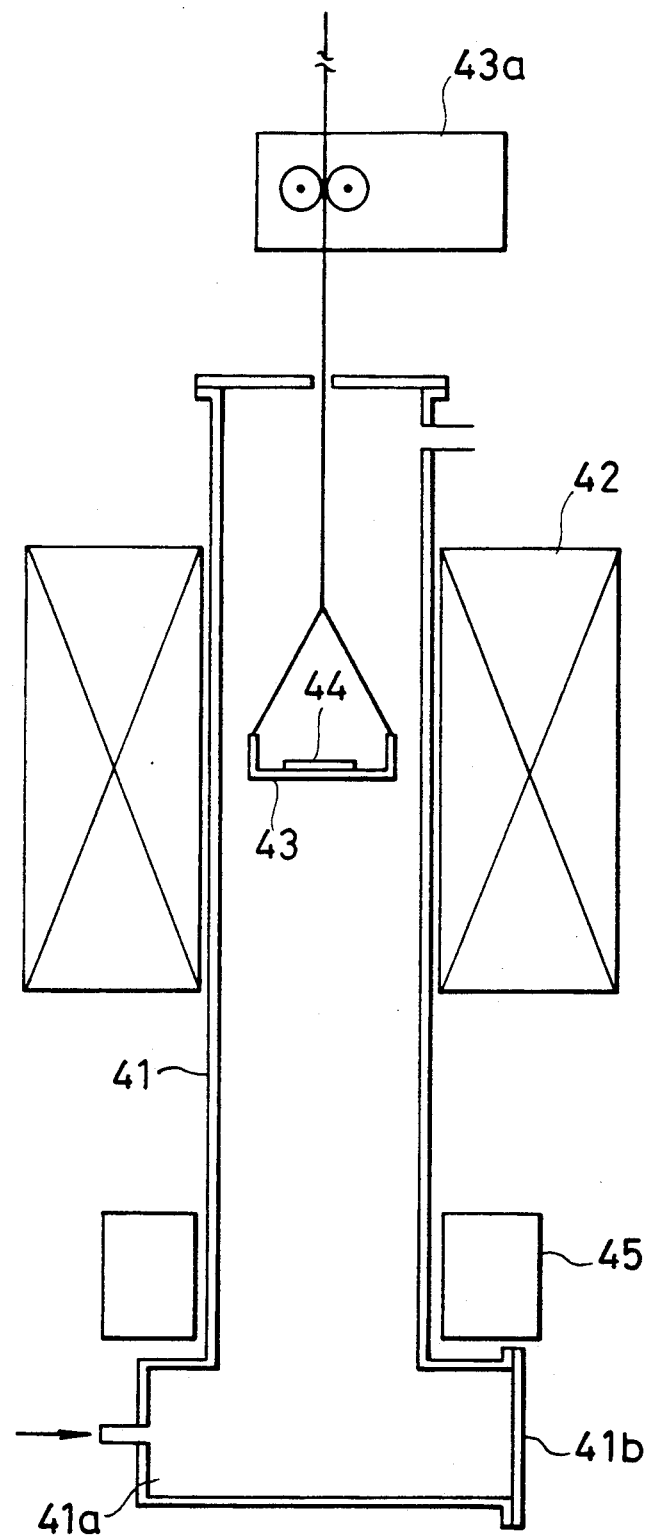
FIG. 7 is a schematic vertical sectional view showing the construction of the heat treatment furnace used for adjusting, by the thermal hysteresis method, the coupling ratio of the directional coupler sample of the first embodiment of the present invention.

FIG. 7 is a vertical sectional view showing the construction of a heat treatment apparatus used for adjusting the coupling ratio of the directional coupler of the first embodiment of the present invention. The heat treatment apparatus is a vertical cylindrical furnace comprising a furnace core 41 made of silica glass, a heating unit 42 surrounding the furnace core 41, a sample holder 43, a sample 44 to be heat treated on the sample holder 43, a sample holder elevator 43a for raising or lowering the sample holder 43, a thermal insulation device 45, a cooling chamber 41a, and a sample ejection exit 41b.

Figure 8:
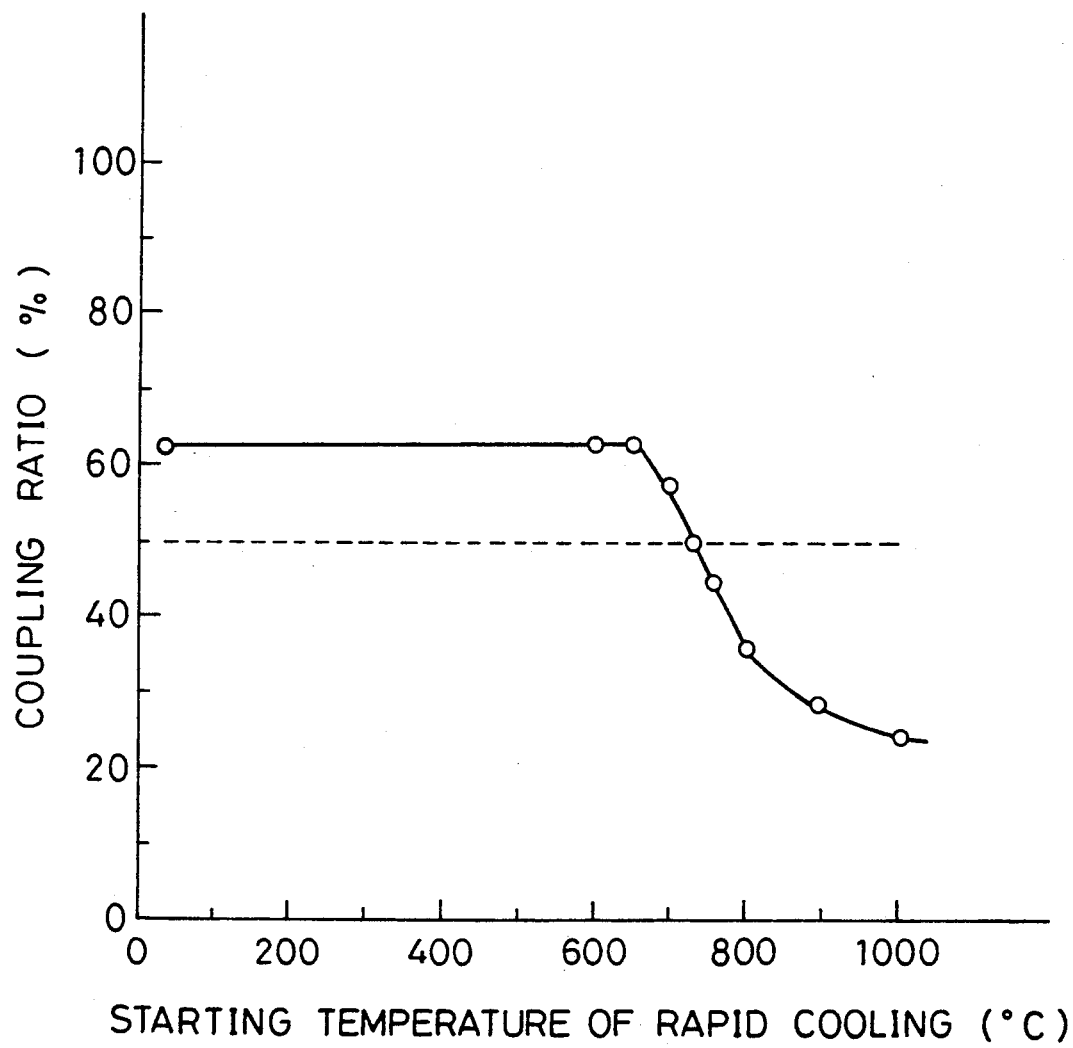
FIG. 8 is a characteristic diagram illustrating the dependence of the coupling ratio on the starting temperature of rapid cooling at a rate of $-500°$ C./sec of the directional coupler of the first embodiment of the present invention.

FIG. 8 is a graph illustrating the dependence of the coupling ratio on the starting temperature (600°–900° C.) of rapid cooling of the directional coupler, which is measured as follows: first, the sample 44 of the directional coupler obtained by the above-described process as shown in FIGS. 6A–6E was set on the sample holder 43 of FIG. 7; second, it was heated by the heater unit 42 at the heat treatment temperature (that is, at the starting temperature of the rapid cooling) for ten minutes; third, the elevator 43a was driven so that the sample 44 was quickly moved down to the cooling chamber 41a; and finally, the coupling ratio of the directional coupler (the sample 44) subjected to the heat treatment of the rapid cooling was measured. The parameters of the sample 44 are as follows: the space between the proximity waveguides in the coupling portion is 4 $\mu$m; the length of the proximity parallel portion is 500 $\mu$m; and the coupling ratio C before the heat treatment is 63% at the wavelength of 1.55 $\mu$m. FIG. 8 shows that the coupling ratio C begins to decline when the starting temperature of the rapid cooling exceeds 650° C., and decreases to about 36% at 800° C. The desired coupling ratio of 50% is accomplished by starting the rapid cooling at 730° C. after ten minutes heating.

According to the present embodiment, the coupling ratio of the directional coupler can be adjusted by the heat treatment in a considerably wide range after the directional coupler has been formed.

Here, emphasis must be placed on the fact that the method for adjusting the coupling ratio of the present invention is reversible because it is based on a thermal hysteresis phenomenon. For example, in FIG. 8, when the directional coupler whose coupling ratio is reduced to 36% by the heat treatment of 800° C. is heated again to about 1000° C. in the electric furnace, and then is slowly cooled at a rate of $-10^{-2}°$ C./sec to near the room temperature, the coupling ratio returns to the initial value of 63%, which operation can be repeated desired times. This proves that the change of the coupling ratio based on the thermal hysteresis phenomenon is not due to the diffusion or evaporation of the dopant in the glass material.

Figure 9:
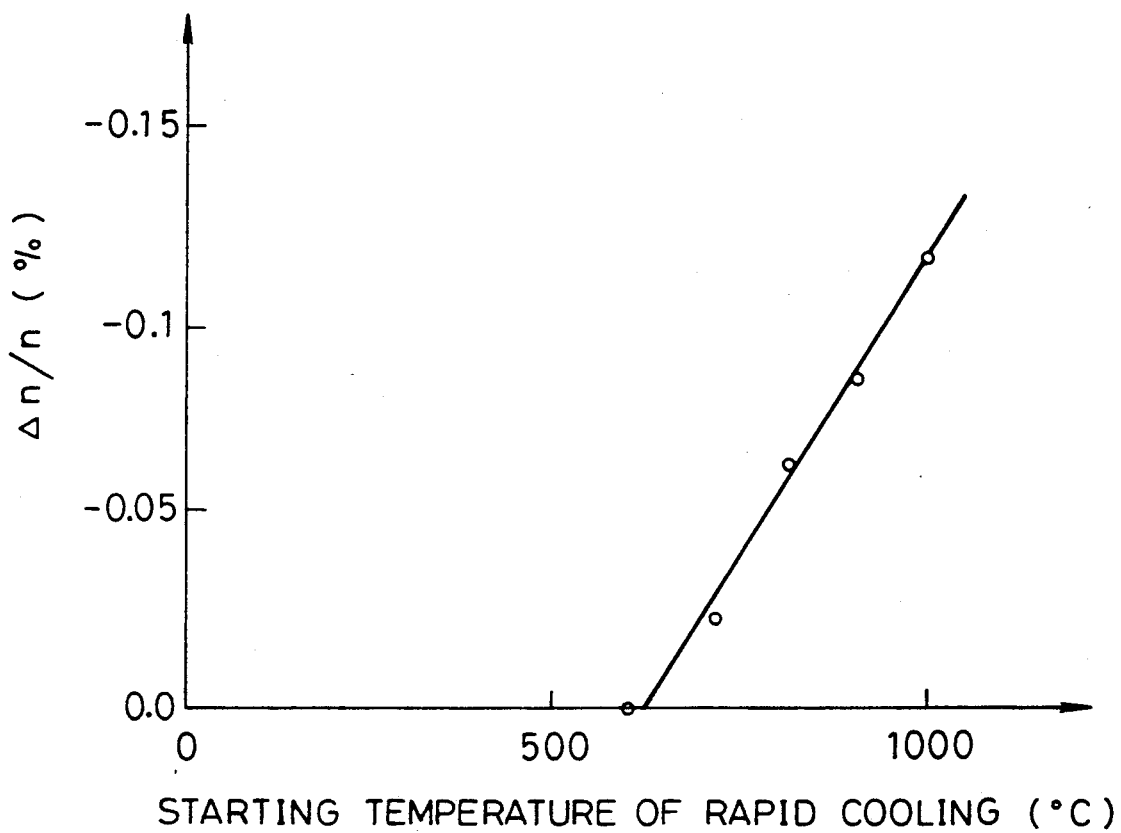
FIG. 9 is a characteristic diagram illustrating the relationship between the change in the refractive index and the starting temperature of the rapid cooling in the thermal hysteresis method of the first embodiment of the present invention.

An interference microscopic observation was carried out with regard to a cross section of the sample to find the mechanism of the temperature dependence of the coupling ratio in the heat treatment, and it was found that the refractive index of the over cladding layer 7 changed by the heat treatment. FIG. 9 is a graph that illustrates the relationship between ratio $\Delta n/n$ and the starting temperature of the rapid cooling in the heat treatment: The y axis indicates the ratio $\Delta n/n$ where $\Delta n$ is the refractive index change of the over cladding layer 7 whose refractive index is n; and the x axis indicates the starting temperature of the rapid cooling at a rate of $-500°$ C./sec. For example, the ratio $\Delta n/n$ caused by the rapid cooling from the temperature 1,000° C. was $-0.12\%$. Subsequent slow cooling at a rate of $-10^{-2°}$ C./sec after heating at 1,000° C. returned the refractive index of over cladding layer 7 to the initial value.

Such a thermal hysteresis phenomenon which exerts effect on the refractive index of the over cladding layer 7 can be explained as the stabilizing phenomenon of glass, which is known in the glass material field (see, Sumio Sakka, "Science of glass amorphousness", page 47, published by Uchida Roukakuho, Japan). A certain amount of temperature dependence of the density of glass is essential to produce a substantial thermal hysteresis phenomenon: for this reason, silica-based glass that includes the dopant such as B and P, and has a large thermal expansion coefficient is liable to produce the thermal hysteresis phenomenon in comparison with pure silica glass.

Figure 10:
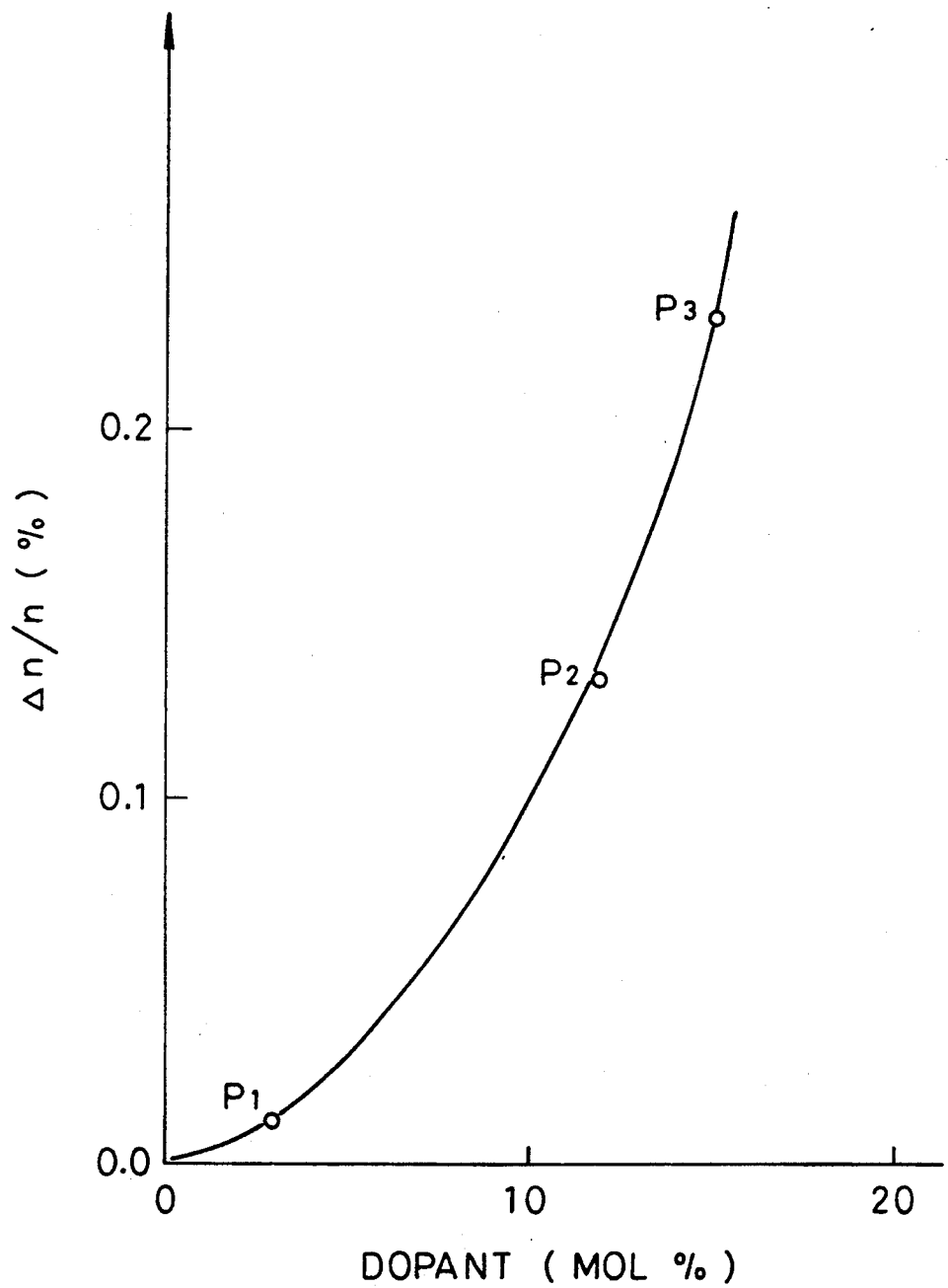
FIG. 10 is a characteristic diagram illustrating the relationship between the dopant concentration of the over cladding layer 7 or the under cladding layer 8 and the variation of the index thereof caused by the thermal hysteresis phenomenon when the sample was cooled rapidly at a rate of $-500°$ C./sec after it had been heated ten minutes at $1,000°$ C. in the first embodiment of the present invention.

FIG. 10 is a graph illustrating the relationship between the dopant concentration of the over cladding layer 7 or the under cladding layer 8 and the variation of the index thereof caused by the thermal hysteresis phenomenon when the sample was cooled rapidly at a rate of $-500°$ C./sec after it had been heated ten minutes at 1,000° C. Here, the x axis represents the total sum of the dopant, $B_2O_3$ and $P_2O_5$ of 2:1 in mol percent, and the y axis indicates the ratio $\Delta n/n$, where $\Delta n$ is the change in the refractive index caused by the thermal hysteresis phenomenon and n is the refractive index. In this figure, a point $P_1$ indicates the change in the refractive index of the under cladding layer 8, and points $P_2$ and $P_3$ indicate that of the over cladding layer 7. FIG. 10 shows that the rate of change in the refractive index caused by the thermal hysteresis phenomenon alters according to the quantity of the dopant.

The thermal hysteresis phenomenon will be describe as follows: When glass, which has been heated to a high temperature and has been stabilized at that high temperature, is cooled rapidly, the density change in the glass cannot catch up with the rapid cooling so that the considerably loose state in the glass at the high temperature is maintained even at the room temperature or thereabout. This is supposed to be the major reason for the decline of the refractive index of the over cladding layer caused by the rapid cooling (see, FIG. 9). Relative decrease in the refractive index of the over cladding layer 7 increases the confinement of the light electric field into the cores 1 and 2 of the directional coupler, thereby decreases the coupling ratio, which explains the result shown in FIG. 8.

The thermal hysteresis phenomenon differs from the thermo-optical effect which has been conventionally used to control the optical length of optical devices in the following: the temperature used in the thermo-optical effect ranges from the room temperature to 100° C., and the refractive index change is only maintained as long as heat is applied; in contrast with this, the temperature used in the thermal hysteresis phenomenon ranges from 500°–1,000° C., and a permanent refractive index change is formed by the cooling (rapid or slow cooling) after the heating, and remains thereafter (it is possible to reproduce the original refractive index only by reheating).

In the example shown in FIG. 8, the sample of the directional coupler was subjected first to preliminary slow cooling, and then to the heat treatment of heating and rapid cooling to adjust the coupling ratio. The coupling ratio, however, can be adjusted by performing preliminary rapid cooling of the sample from a high temperature of about 1,000°–1,200° C., and then by reheating the sample at a temperature of 600°–700° C. with controlling the reheating time period, an example of which will be described below.

Figure 11:
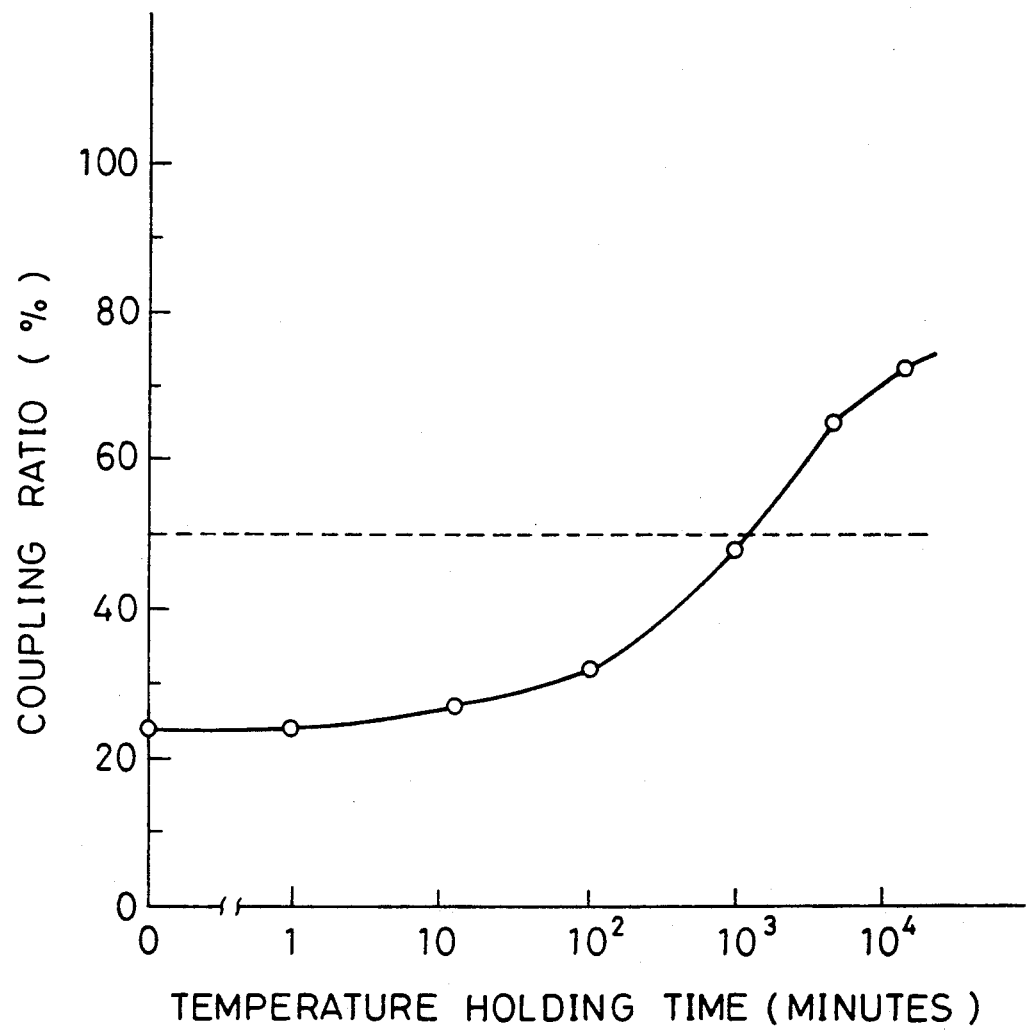
FIG. 11 is a characteristic diagram illustrating the relationship between the coupling ratio and a temperature holding time period when the sample of the directional coupler was heated at $600°$ C. in the electric furnace, and the temperature was maintained for the temperature holding time period, and then the sample was cooled rapidly at a rate of $-500°$ C./sec in the first embodiment of the present invention.

FIG. 11 is a graph illustrating the relationship between the coupling ratio and a temperature holding time period when the sample of the directional coupler was heated at 600° C. in the electric furnace, and the temperature was maintained for the temperature holding time period, and then the sample was cooled rapidly at a rate of $-500°$ C./sec. Here, the x axis indicates the temperature holding time period, and the y axis represents the coupling ratio. The coupling ratio, which was 23% before reheating, increases with the increase of the temperature holding time period, and crosses the level of about 50% coupling ratio after about 1,000 minutes.

The above-described characteristic diagrams of FIGS. 8 and 11 show that the coupling ratio of the directional coupler can be set at a desired value (50%, for example) by the fine adjustment of the present invention using the thermal hysteresis phenomenon.

Figure 12:
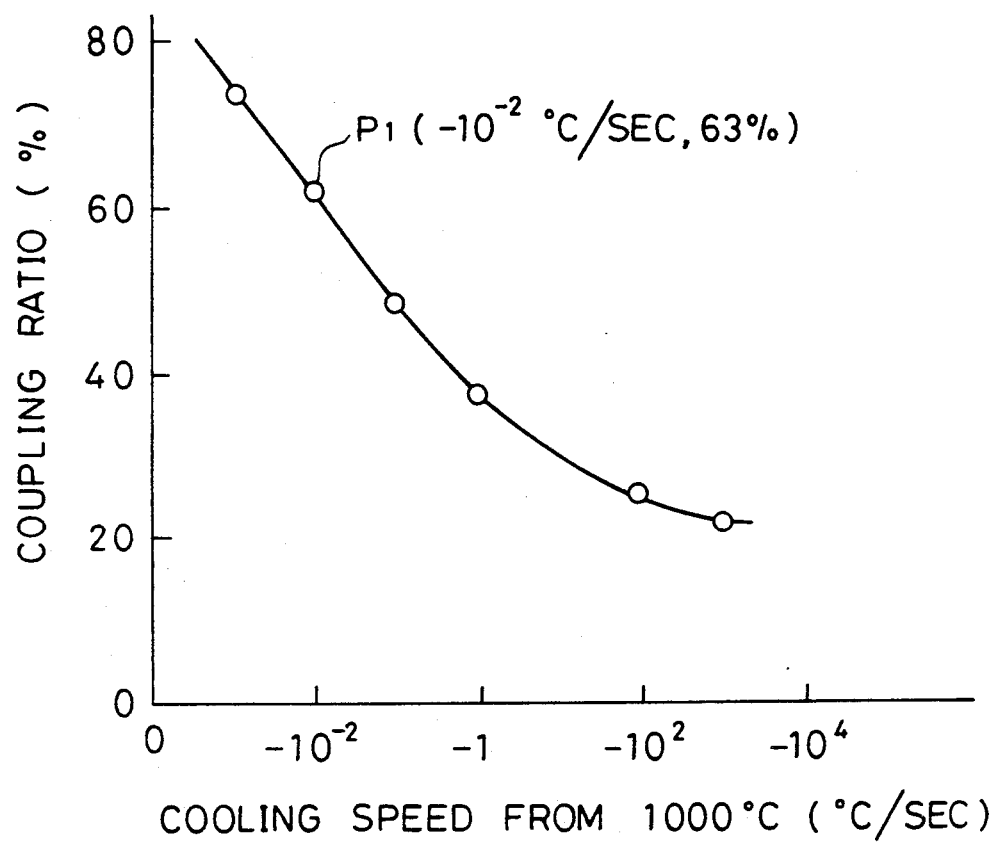
FIG. 12 is a characteristic diagram showing the relationship between the coupling ratio and the cooling speed when the sample of the directional coupler was heated to $1,000°$ C., maintained at $1,000°$ C. for ten minutes, and then cooled at various cooling speed in the first embodiment of the present invention.
Figure 13A:
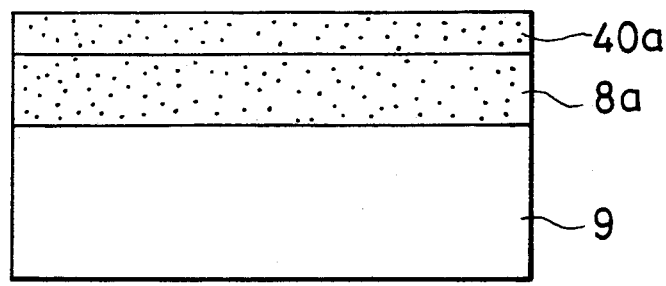
FIGS. 13A–13D are sectional views showing the process for fabricating a waveguide according to a second embodiment of the present invention.
Figure 13B:
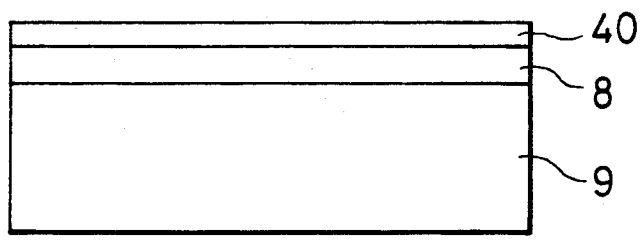
Figure 13C:
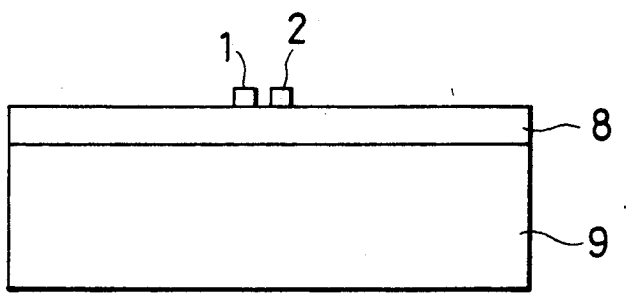
Figure 13D:
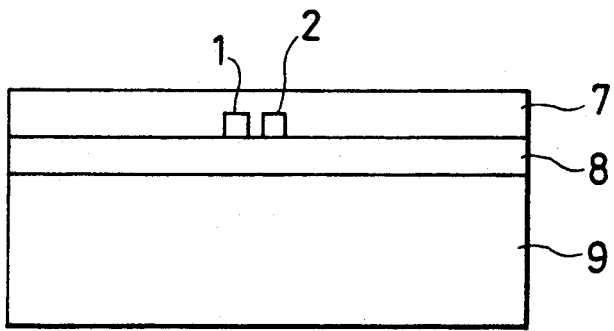

FIG. 12 is a graph showing the relationship between the coupling ratio and the cooling speed when the sample of the directional coupler was heated to 1,000° C., was maintained at 1,000° C. for ten minutes, and then was cooled at various cooling rates. The x axis represents the cooling rate (°C./sec), and the y axis represents the coupling ratio of the directional coupler. In this figure, point $P_1$ indicates the "refractive index difference maintained cooling rate" at which the refractive index difference does not change before and after the thermal hysteresis phenomenon. At this point, the cooling rate is $10^{-2°}$ C./sec, and the coupling ratio is set at 63%.

When the cooling rate is greater than that of point $P_1$, the refractive index of the over cladding layer 7 decreases, thereby increasing the refractive index difference between the layer 7 and the cores. This increases the confinement of light into the cores, thus decreasing the coupling ratio. In contrast, when the cooling rate is less than that of the point $P_1$, the coupling ratio will increase in the reverse mechanism. Accordingly, a desired coupling ratio can be achieved by controlling the cooling rate. It is obvious that a more rapid cooling rate is preferable for practical use, because this will shorten the fabrication time.

Effective adjustment of the coupling ratio by the heat treatment, in which the entire sample including the substrate is heated in the electric furnace to undergo the thermal hysteresis phenomenon, requires a substantial difference in the dopant concentration between the cores and the cladding layer. In the embodiment 1, a large quantity of dopant (B and P) is contained in the over cladding layer 7. This is because forming the over cladding layer which includes more dopant and hence has a lower softening point, on the cores which includes less dopant and has a higher softening point makes the fabrication process easier. The dopant concentration of the cores and the over cladding layer can be reversed when the over cladding layer is formed by so-called low temperature process such as the CVD (Chemical Vapor Deposition) process, sputtering process, or the like, and hence no thermal deformation is expected. The following is an example of such a case.

EMBODIMENT 2

In the embodiment 1, the over cladding layer contains more dopant than the cores, and the coupling ratio of the directional coupler is adjusted by using the refractive index difference caused by the thermal hysteresis phenomenon between the two. In this embodiment, the cores contain more dopant than the over cladding layer.

FIGS. 13A–13D show the process for fabricating waveguides according to the embodiment 2. Steps for forming the under cladding layer 8 and the cores 1 and 2, namely, deposition of fine glass particles, heat treatment for consolidation, and forming of the waveguides by the reactive ion etching, are identical to those of the embodiment 1. Here, the cores 1 and 2 contains not only dopant Ge for controlling the refractive index, but also $B_2O_3$ and $P_2O_5$ the total sum of which is 12 mol %. After that, $SiO_2$ is deposited on the cores 1 and 2 and on the under cladding layers 8, and is subjected to the heat treatment of 1,200° C., thereby to form the over cladding layer 7.

Figure 14:
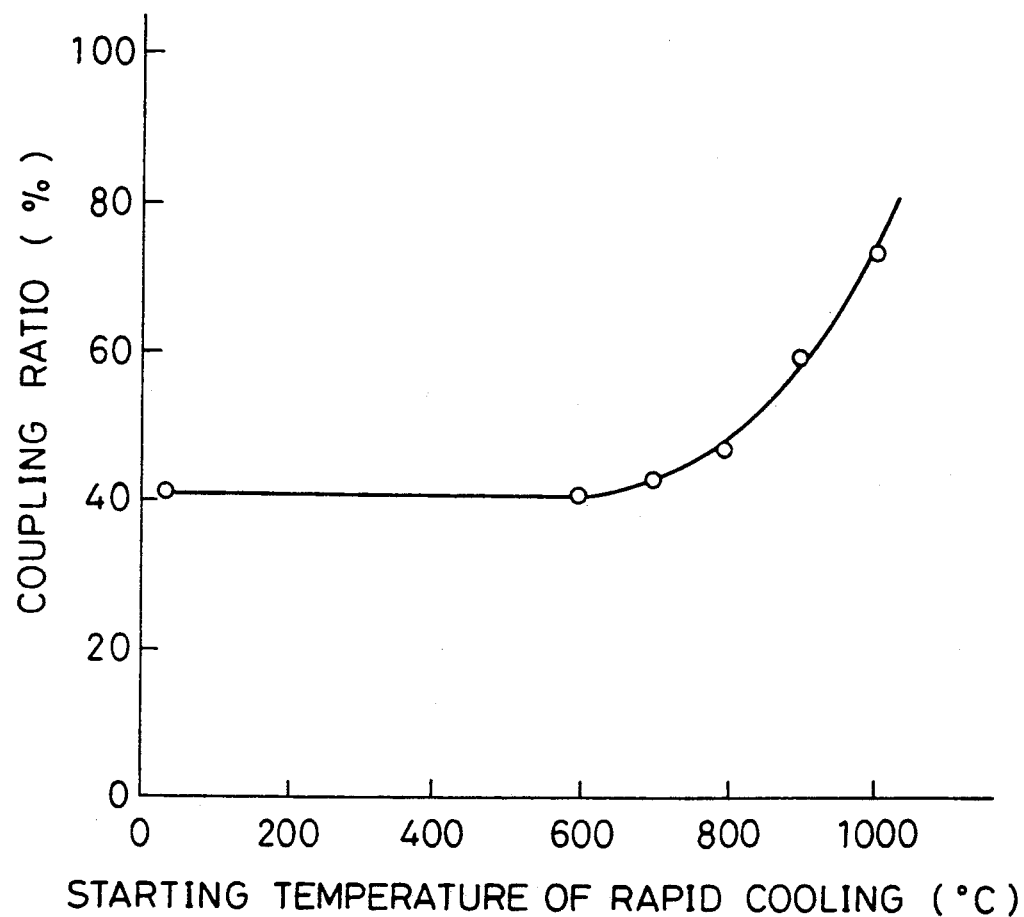
FIG. 14 is a characteristic diagram illustrating the dependence of the coupling ratio on the starting temperature of rapid cooling at a rate of $-500°$ C./sec of the directional coupler of the second embodiment of the present invention.

The directional coupler thus fabricated has the following dimensions: the dimension of the cores (waveguides) is $7 \times 7$ $\mu m^2$; the space between the waveguides placed in close proximity is 4 $\mu m$; and the length of that parallel portion is 500 $\mu m$. The coupling ratio was 41% at the wavelength of 1.55 $\mu m$ before the heat treatment was carried out for adjusting the coupling ratio. The sample was heated at various temperatures for ten minutes, and then was cooled at the rate of $-500°$ C./sec. The resultant coupling ratios are illustrated in FIG. 14, which shows that the coupling ratios increase with the increase of temperature beyond 600° C. This is possibly because the refractive index of the cores decreases by the heat treatment for adjusting the coupling ratio, and hence the leakage of light from the cores to the cladding layers increases.

In the above embodiments 1 and 2, the characteristic adjustment of the coupling ratio is carried out by heat treating the entire substrate in the electric furnace. This, however, is disadvantageous when the substrate includes a plurality of directional couplers, and their coupling ratios should be independently adjusted.

The following is examples in which the coupling ratios of a plurality of directional couplers included in a guided-wave optical circuit are independently adjusted.

EMBODIMENT 3

Figure 15:
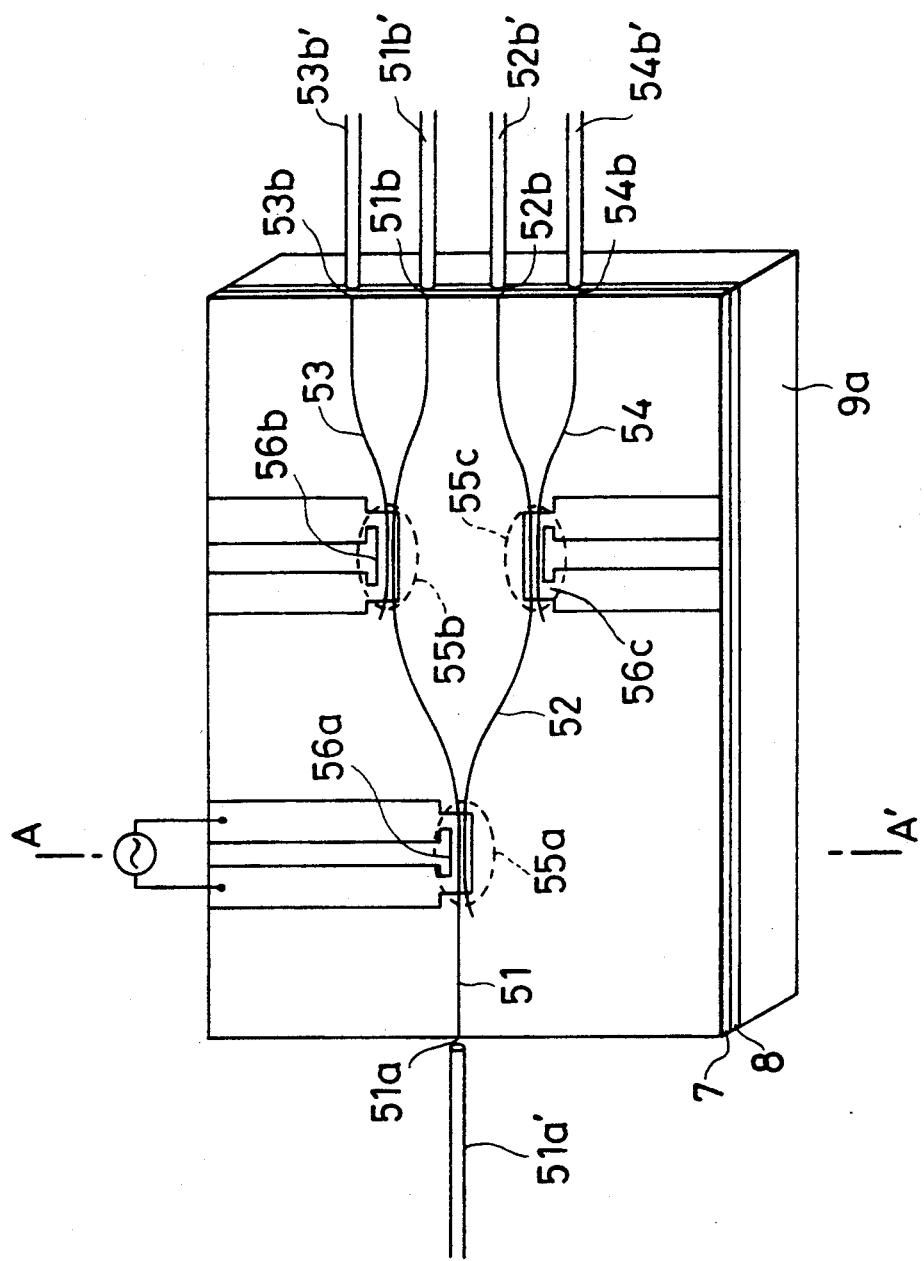
FIGS. 15 and 16 are a perspective view and an enlarged sectional view taken along line A—A' of FIG. 15, respectively, showing, as a third embodiment of the present invention, an optical power splitter the coupling ratios and splitting ratios of which are adjusted by the thermal hysteresis method by using heat-resistant heaters.
Figure 16:
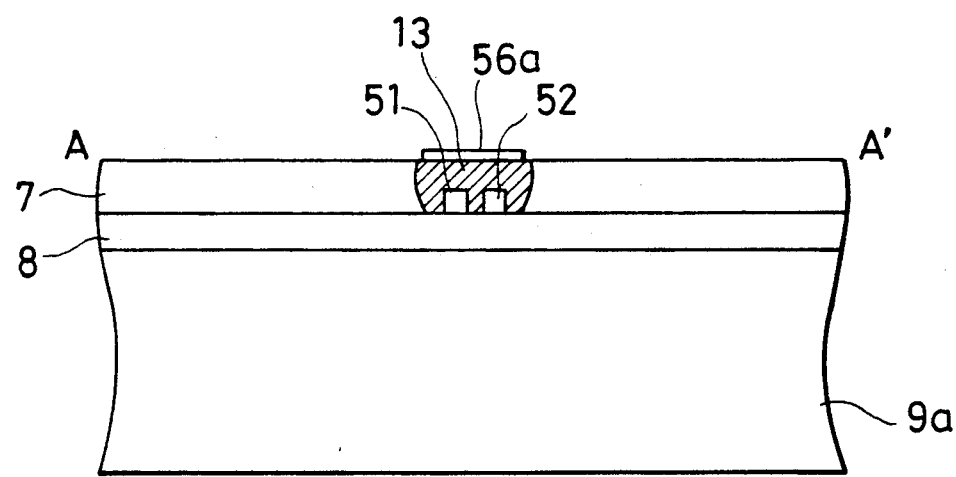

FIGS. 15 and 16 are a perspective view and an enlarged sectional view taken along line A—A' of FIG. 15, respectively, showing an optical power splitter with heat-resistant heaters according to the third embodiment of the present invention. The optical power splitter comprises an under cladding layer 8 made of silica based glass, an over cladding layer 7 made of silica base glass, and silica based optical waveguides (cores) 51, 52, 53 and 54 embedded in the cladding layers 7 and 8, all of which are disposed on a substrate 9a. The optical waveguides 51 and 52 are placed in close proximity at a part thereof, and constitute a directional coupler 55a. Likewise, the optical waveguides 51 and 53 constitute a directional coupler 56b, and the optical waveguides 52 and 54 constitute a directional coupler 56c. These three directional couplers 55a, 55b and 55c are covered by the over cladding layer 7 on which heat-resistant heaters 56a, 56b and 56c are disposed.

The optical power splitter is fabricated as follows: first, the optical circuit including the three directional couplers is formed on the silica-based glass substrate 9a by similar steps described before with reference to FIGS. 6A–6E; and second, the heat-resistant heaters 56a, 56b and 56c made of an NiCr metal film are formed on the over cladding layer 7 by using the electron beam evaporation process and lift off process. Each heat-resistant heater is 50 $\mu m$ wide and 2 mm long.

If the coupling ratios of the three directional couplers are set at 50% without fabrication errors, the entire guided-wave optical circuit of FIG. 15 will operate as a $1 \times 4$ optical power splitter. Adjusting the coupling ratios of the directional couplers to fall in the range of $50\% \pm 1\%$, for example, with high repeatability, however, is extremely difficult as described before with the first embodiment. The present embodiment, however, can tune the coupling ratios to a desired value of 50% by appropriately heat treating the over cladding layer 7 by the heat-resistant heaters 56a, 56b and 56c.

FIG. 16 shows a region 13 in which the thermal hysteresis phenomenon was produced: the thermal hysteresis produced region 13 was formed by supplying the heat-resistant heater with an electric power of 10 W to heat the region at about 900° C. for about 1 minute, and by stop supplying the power to cool the region rapidly.

Once the adjustment of coupling ratio has been completed by using the heat-resistant heaters 56a, 56b and 56c, a light signal which is incident onto an input port 51a via an input optical fiber 51a' and is transmitted through the optical waveguide 51, is correctly halved by the directional coupler 55a, and is successively halved by the directional couplers 55b and 55c, thereby passing from output ports 53b, 51b, 52b and 54b to output optical fibers 53b', 51b', 52b' and 54b', respectively.

According to the adjusting method of the coupling ratio of the present embodiment, the three directional couplers can be adjusted independently. This makes the adjustment more flexible than the method of the first embodiment which heats the entire substrate in the electric furnace. Furthermore, quick and precise characteristic adjustment is possible because the region 13 in which the thermal hysteresis is produced is localized, and hence heating and cooling of the region 13 is possible with the input and output fibers 51a', 53b', 51b', 52b' and 54b' connected to the ends of the substrate to pass the light signal through the optical circuit. In addition, a metal block for cooling can be disposed at the bottom of the substrate 9a so as to prevent the thermal energy produced from the heat-resistant heater 56a, 56b and 56c from reaching the input and output fibers as much as possible.

The heat-resistant heaters of the present embodiment have such a simple structure as the NiCr metal film is formed on the over cladding layer 7. The structure, however, can be altered to multilayer structure, thereby improving the reliability of the heat-resistant heaters themselves. An example of this will be described with reference to FIGS. 17A and 18B which are enlarged sectional views of the heater.

Figure 17A:
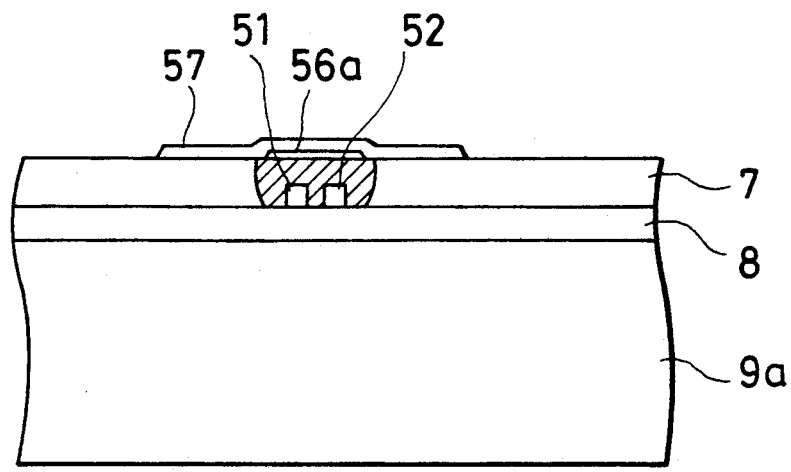
FIG. 17A is a sectional view showing an improved example of the third embodiment of the present invention, in which a protective layer 57 of $SiO_2$ film of about $0.3$ $\mu$m thickness is formed on the NiCr heat-resistant heater 56a by electron beam deposition process.

FIG. 17A shows an example in which a protective layer 57 of an $SiO_2$ film of about 0.3 μm thickness is formed on the NiCr heat-resistant heater 56a by electron beam deposition process. The $SiO_2$ protective layer 57 is very effective to prevent the reaction between the NiCr heat-resistant heater 56a and the air during heating.

Figure 17B:
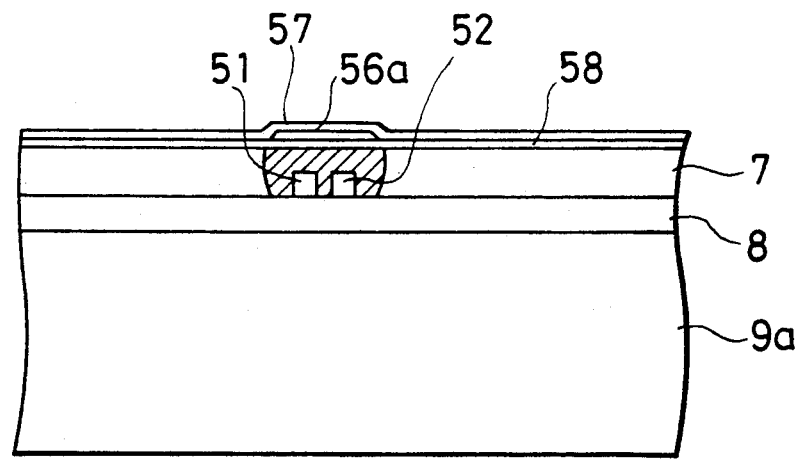
FIG. 17B is a sectional view showing another improved example of the third embodiment of the present invention, in which a bottom protective layer 58 is previously disposed under the heat-resistant heater 56a, in addition to the protective layer 57.

FIG. 17B shows an example in which a bottom protective layer 58 is previously disposed under the heat-resistant heater 56a, in addition to the protective layer 57. The bottom protective layer 58 is also made of an $SiO_2$ film of 0.3 μm thickness, and is formed by the electron beam deposition process. The layer 58 is very effective to completely prevent the reaction between the dopant (B and P) contained in large quantities in the over cladding layer 7 and the NiCr heat-resistant heater during heating.

Although driving the heat-resistant heaters can be achieved by using either a direct current or an alternating current, an alternating current drive of about 10 kHz is preferable in the case where the high temperature heating is performed. This is because the alternating current drive can prevent electrolysis or migration of ions in the heater material from occurring at a high temperature.

In the present embodiment, the coupling ratios of the plurality of directional couplers are independently adjusted by the heat-resistant heaters. The adjustment, however, can be carried out by heat treating the entire sample together with the substrate in the electric furnace as in the first embodiment so that a uniform change in the coupling ratios of all the directional couplers is accomplished. In this case, the heat-resistant heaters are also subjected to the high temperature of the electric furnace during this heat treatment, but the NiCr heat-resistant heaters, for example, can sufficiently endure high temperatures of about 1,000° C. It is also effective to supply the electric furnace with inert gas such as argon gas to prevent oxidation of the NiCr metal film.

In this third embodiment, silica glass is used as the substrate. When a silicon substrate is used instead of that, it must be noted that the heat-resistant heaters require larger amount of electric power in the heat treatment because the silicon crystal has greater thermal conductivity than silica glass.

Next, an embodiment which implements savings of power supply to heat-resistant heaters on a silicon substrate will be described.

EMBODIMENT 4

Figure 18A:
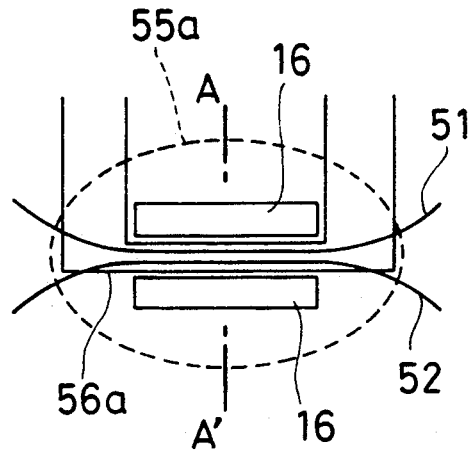
FIGS. 18A and 18B are an enlarged plan view and a sectional view taken along line A—A' of FIG. 18A, respectively, showing the region of a directional coupler of a 1:4 guided-wave optical power splitter on a silicon substrate of a fourth embodiment of the present invention, wherein the directional coupler is provided with heat-resistant heaters having heat insulating grooves.
Figure 18B:
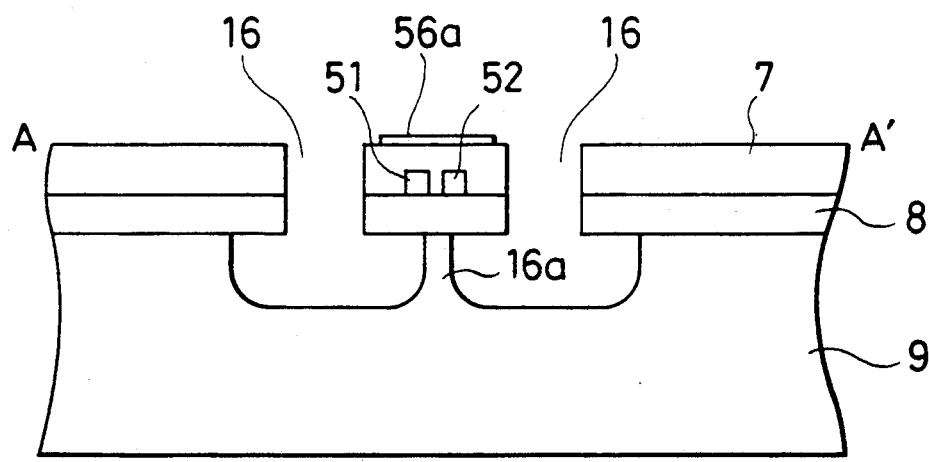

FIGS. 18A and 18B are an enlarged plan view and a sectional view taken along line A—A' of FIG. 18A, respectively, showing the region of a directional coupler 55a that can reduce the power supply to the heat-resistant heaters. The directional coupler 55a substitutes a silicon substrate 9 for the silica glass substrate 9a of the guided-wave type 1×4 optical power splitter shown in FIGS. 15 and 16 of the third embodiment, and in addition, heat insulating grooves for preventing heat dispersion are provided on either side of the directional coupler. The grooves 16 can be formed by the reactive ion etching and lithography technique which is disclosed, for example, in Japanese Patent Application Laying-Open No. 1-158413, 1989. Two optical waveguides 51 and 52 in the region of the directional coupler 55a are supported, together with a cladding region surrounding them, by a thin column 16a of silicon crystal. Using this sample can reduce the power by about one order of magnitude to obtain a desired coupling ratio in comparison with the sample using a silicon substrate having no heat insulating groove. Furthermore, the grooves 16 can inhibit a slight polarization dependence of the directional coupler by releasing stress applied to the optical waveguides by the substrate 9.

EMBODIMENT 5

Figure 19:
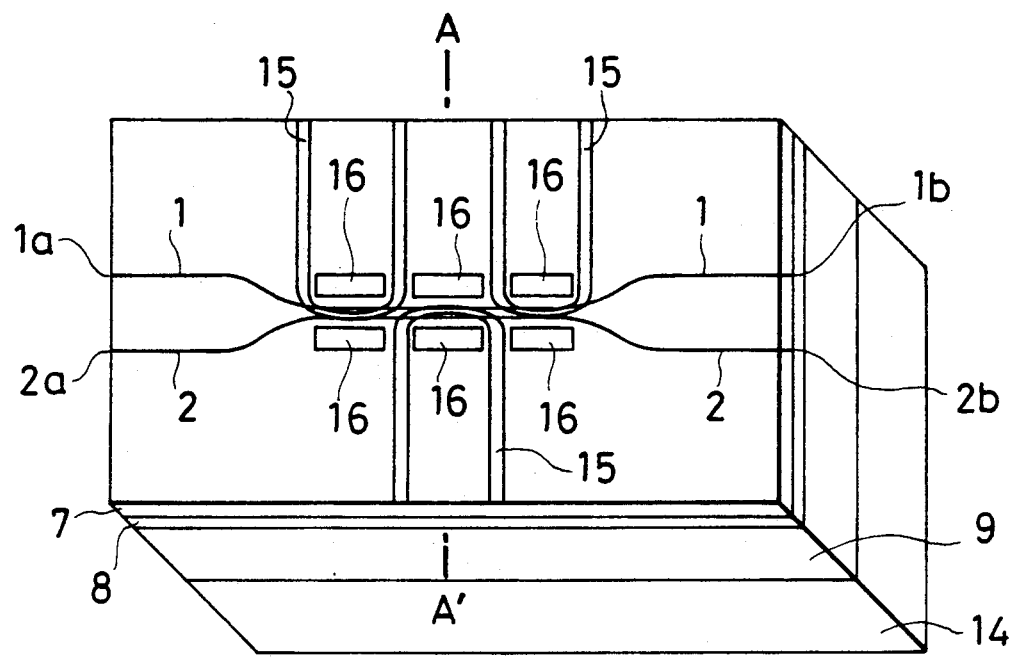
FIGS. 19 and 20 are a perspective view and an enlarged cross sectional view taken along line A—A' of FIG. 19, respectively, showing, as a fifth embodiment of the present invention, a guided-wave directional coupler and the adjusting method of the coupling ratio thereof which is adjusted by the thermal hysteresis method using distribution type heat-resistant heaters.
Figure 20:
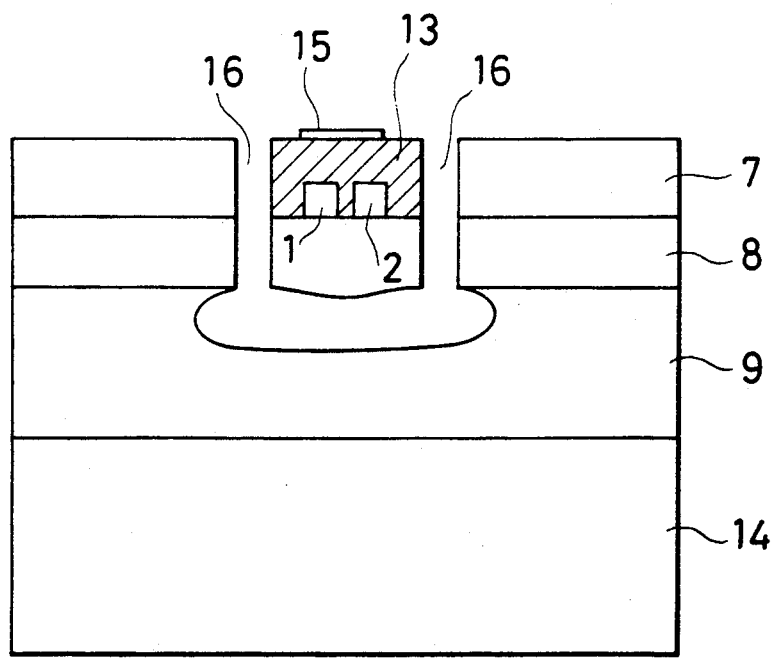

FIGS. 19 and 20 are a perspective view and an enlarged cross sectional view taken along line A—A' of FIG. 19, respectively, showing the circuit arrangement of a single directional coupler with heat-resistant heaters according to a fifth embodiment of the present invention. A plurality of heat-resistant heaters 15 are separately disposed on the over cladding layer 7 so as to change a heat treatment area, and further, heat insulating grooves 16 are also separately disposed along the waveguides corresponding to the plurality of heat-resistant heaters. In this embodiment, the optical waveguides 1 and 2 under the heat-resistant heaters 15 are completely separated from the body of substrate 9, thereby accomplishing more complete heat insulation. Furthermore, a thermal balancing copper block 14 adhering to the bottom of the silicon substrate 9 makes it possible to carry out the coupling ratio adjusting operation independently of the surrounding temperature. The copper block 14 may be provided with a preheating heater embedded therein so that the entire substrate 9 is heated to about 400° C. to apply a kind of temperature bias to the substrate 9, thus helping the heating and rapid cooling operation by the heat-resistant heaters 15.

In the above embodiments 3–5, the heat-resistant heaters are used to induce a localized thermal hysteresis phenomenon in a desired place of the guided-wave optical circuit. This, however, is not essential: the localized hysteresis phenomenon can be induced by irradiating a desired place with an energy beam produced by a carbon dioxide laser ($CO_2$ laser) or a discharge as will be described below.

EMBODIMENT 6

Figure 21:
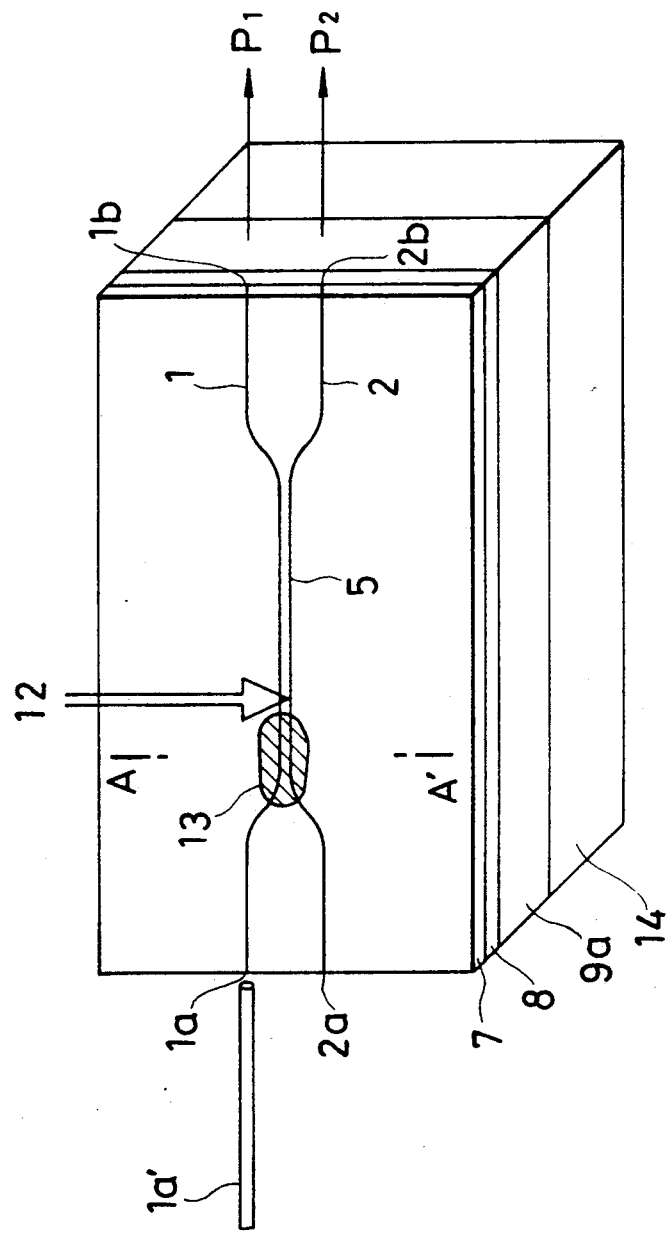
FIG. 21 is a perspective view showing, as a sixth embodiment of the present invention, an arrangement of a guided-wave directional coupler on a silica glass substrate, and an adjusting method of the coupling ratio thereof by using a $CO_2$ laser.

FIG. 21 is a perspective view showing an arrangement of a directional coupler on a silica glass substrate, and an adjusting method of the coupling ratio thereof according to a sixth embodiment of the present invention. A $CO_2$ laser beam 12 for heating a thermal hysteresis phenomenon produced region 13 is supplied from the outside. A copper block 14 for heat radiation adheres to the bottom of the silica glass substrate 9a. A sample used in the present embodiment is fabricated as follows using above described method: an under cladding layer 8 is formed on the silica glass substrate 9a; subsequently, a core layer whose major component is $SiO_2$-$TiO_2$ is deposited by the flame hydrolysis reaction; unnecessary portions of the core layer are removed by the reactive ion etching process, thereby forming the cores 1 and 2; and finally, an over cladding layer 7 whose major component is $SiO_2$ is formed by using the flame hydrolysis reaction so that the cores 1 and 2 are embedded therein.

The over cladding layer 7 includes a large amount of $P_2O_5$ and $B_2O_3$, the total sum of which is about 15–25 mol %, and the directional coupler 5 is fabricated so that its coupling ratio falls within 55±5%. The coupling ratio decreased by approximately 1% after one second irradiation of the coupling portion of the directional coupler with the $CO_2$ laser beam 12 of about 5 W, followed by a sudden stop of the irradiation. In this case, the bottom of the silica glass substrate 9a is stuck to the copper block 14 to help heat radiation.

Figure 22:
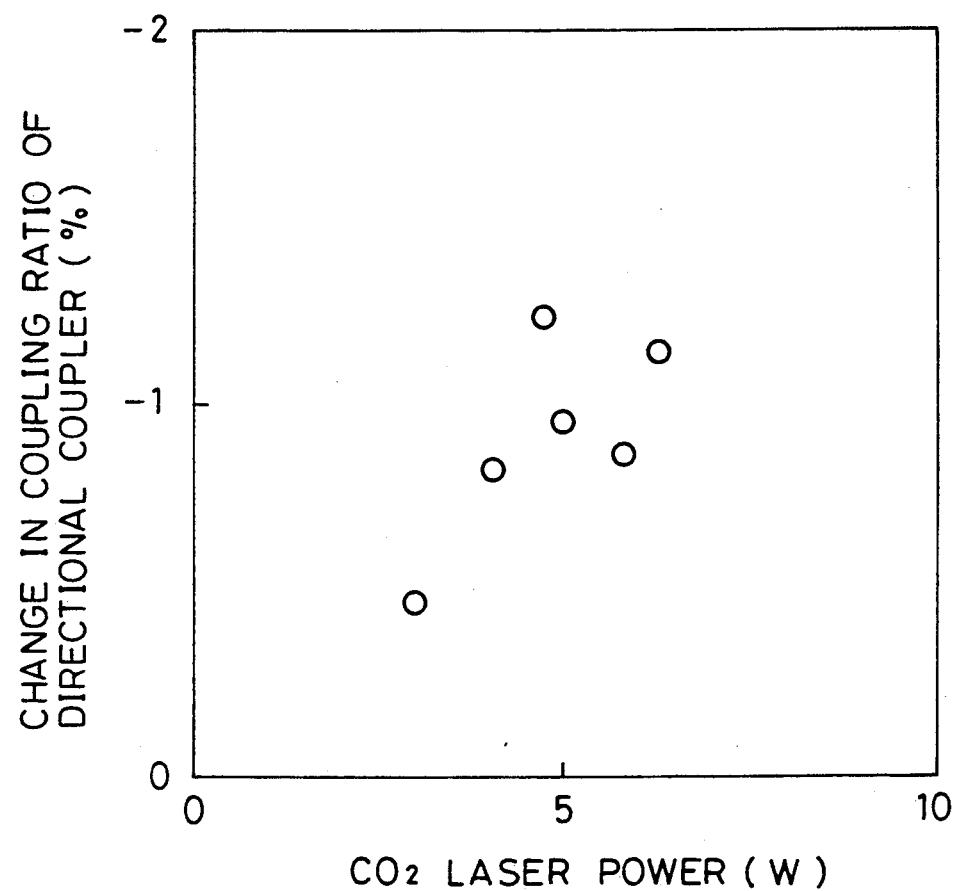
FIG. 22 is a graph showing results of the experiment of the sixth embodiment of the present invention, wherein y axis indicates the change in the coupling ratio of the directional coupler, and x axis represents the power of the $CO_2$ laser.

FIG. 22 shows results of the above experiment: the y axis indicates the change in the coupling ratio of the directional coupler, and the x axis represents the power of the $CO_2$ laser. Here, the irradiation time period of the $CO_2$ laser beam 12 was one second, the spot diameter of the $CO_2$ laser beam 12 was about 500 $\mu$m, and the space between the waveguides in the coupling portion of the directional coupler was 4 $\mu$m. When the laser power exceeded 8 W, deformation of the glass occurred, thus increasing the optical loss of the waveguides. In this experiment, the coupling ratio decreases more with the increase of the space between the waveguides in the coupling portion of the directional coupler 5, depending on the heat treatment temperature (i.e., $CO_2$ laser power), and on the heat treatment area. When the region 13 is irradiated again with the $CO_2$ laser beam 12 of 5 W for one second, followed by a slow cooling of about 28 hours by gradually declining the power of the $CO_2$ laser beam, the coupling ratio of the directional coupler returns to the original value.

The adjusting method of the coupling ratio of the directional coupler will be describe more specifically.

In FIG. 21, the output powers $P_1$ and $P_2$ produced from output ports 1b and 2b are continually observed while supplying a beam of light to an input port 1a. When $P_1 < P_2$, the region 13 of the directional coupler 5 is heated by the $CO_2$ laser beam 12, followed by rapid cooling. This operation will decrease the coupling ratio, thereby increasing the output power $P_1$. When still $P_1 < P_2$, the operation is repeated with an increased area of the region 13, or with an elevated heating temperature. When the adjustment exceeds and $P_1 > P_2$ occurs, the region 13 is heated by the $CO_2$ laser beam 12 of a power corresponding to the difference between $P_1$ and $P_2$, followed by slow cooling, thereby producing the final state of $P_1 = P_2$.

Here, parameters that can undergo fine adjustment are the area of the thermal hysteresis phenomenon produced region 13, the temperature of the heat treatment (the power of the $CO_2$ laser beam 12), cooling rate (declining rate of the power of the $CO_2$ laser beam 12), and the time period of the heat treatment (irradiation time of the $CO_2$ laser beam 12). These parameters should be suitably determined in accordance with a shape or a material of the sample.

As a result of the adjustment, the coupling ratio of the directional coupler fell within the range of 50±1%.

Here, emphasis must be placed on the fact that the adjusting operation of the coupling ratio of the directional coupler by the $CO_2$ laser beam is reversible because it is based on the so-called "stabilizing phenomenon" of the silica-base glass including a large amount of dopant, which phenomenon does not involve the diffusion or evaporation of the dopant in the over cladding layer 7. Accordingly, an excess heat treatment including heating and rapid cooling can be eliminated by a subsequent heat treatment including heating and slow cooling. If necessary, heating the entire sample at about 1,000° C. in the electric furnace, followed by slow cooling at a rate of $-10^{2°}$ C./sec, will recover the initial state by eliminating the whole thermal hysteresis phenomena produced before by the $CO_2$ laser beam.

It must be also noticed that when the adjustment of the coupling ratio is carried out from the surface of the over cladding layer 7 by heating with the heat-resistant heaters or with the $CO_2$ laser beam as in the embodiments 3-6, the substantial difference of the dopant concentration between the over cladding layer 7 and the cores and under cladding layer 8 is not essential, which is different from the embodiment 1. The reason for this is as follows: the temperature distribution, in which high temperatures appear at the over cladding layer surface, and low temperatures appear near the surface of the substrate, occurs by the heating from the over cladding layer surface regardless of the dopant concentrations in the glass layers; this will produce the refractive index difference between the cores 1 and 2 and the over cladding layer 7.

In the above-described embodiments, the present invention is applied to the coupling ratio adjustment of the directional couplers. Next, examples in which the present invention is applied to controlling optical path lengths of optical waveguides will be described.

EMBODIMENT 7

Figure 23:
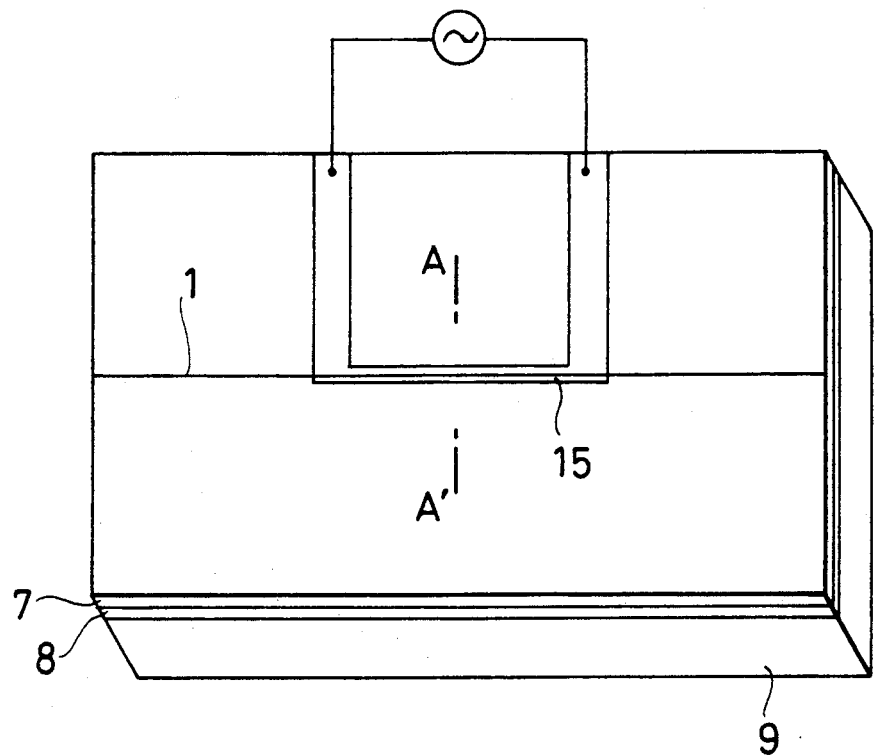
FIGS. 23 and 24 are a perspective view and an enlarged sectional view taken along line A—A' of FIG. 23, respectively, showing, as a seventh embodiment of the present invention, an arrangement and adjusting method of an optical waveguide whose optical path length is controlled by the thermal hysteresis method using a heat-resistant heater.
Figure 24:
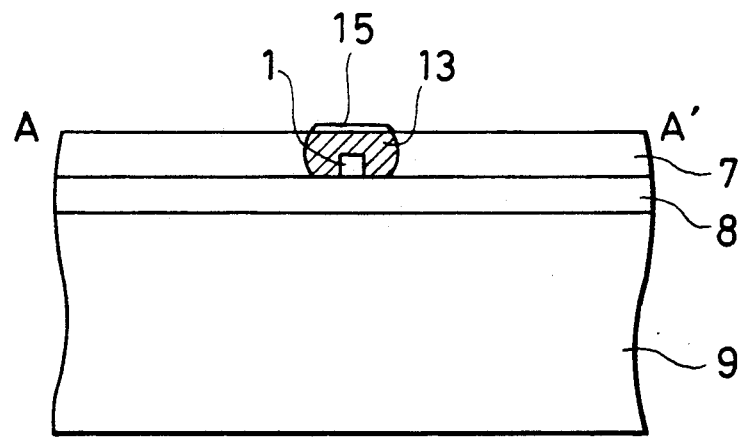

FIGS. 23 and 24 are a perspective view and an enlarged sectional view taken along line A—A' of FIG. 23, respectively, showing an arrangement and adjusting method of an optical waveguide whose optical path length can be controlled, according to a seventh embodiment of the present invention.

Reference numeral 1 designates a silica-based optical waveguide (a core) embedded in the silica-based cladding layers 7 and 8, which is formed on a silicon substrate 9 through similar fabrication steps and with similar glass compositions to those in FIGS. 6A-6E. Reference numeral 15 denotes a heat-resistant heater provided on the over cladding layer 7 covering the optical waveguide 1. The present embodiment differs from the preceding embodiments in the following: In the preceding embodiments, the coupling ratio of the directional coupler is adjusted by changing the refractive index of the over cladding layer 7; in contrast with this, in the present embodiment 7, the effective optical path length of the optical waveguide 1 is elongated (shortened) as a result of increase (decrease) in the equivalent refractive index of the optical waveguide 1, which results from the increase (decrease) of the refractive index of the over cladding layer 7.

In this embodiment, the refractive index change is produced in a region 13 of the over cladding layer 7 by the thermal hysteresis phenomenon caused by heating and rapid cooling (in this case, the refractive index decreases), or by heating and slow cooling (in this case, the refractive index increases) with the heat-resistant heater 15. In a single-mode optical waveguide, a part of a light signal leaks into the cladding layer and is transmitted through the layer along with the major part of the light signal transmitted through the core. As a result, the refractive index increase (decrease) of the over cladding layer 7 covering the core 1 induces the equivalent refractive index increase (decrease) of the optical waveguide 1.

In this embodiment, however, contrary to the expectation that the optical path length be shortened by heating and rapid cooling, the optical path length was elongated by approximately 0.75 $\mu$m by supplying power of maximum 10 W to the heat-resistant heater 15 the length of the heating portion (heat developing portion) of which is 5 mm, and by subsequently cooling rapidly. This corresponds to an optical path length increase of one half wavelength of the light signal having a wavelength of 1.5 $\mu$m, which in turn corresponds to a refractive index increase of about $1.5 \times 10^{-4}$ in terms of the equivalent refractive index change.

The reason for this will become clear by taking into account the effect of stress from the silicon substrate 9, which is developed when the optical waveguide 1 on the silicon substrate 9 is locally heated by the heat-resistant heater 9: The silica-based optical waveguide 1 on the silicon substrate 9 is usually subjected to the compressive stress which is produced by the difference between the thermal expansion coefficient of the silica-based glass and that of the silicon substrate in the room temperature. When the temperature of the over cladding layer 7 is raised with the heat-resistant heater 15, and the heated region 13 is softened, the increasing compressive stress from the silicon substrate 9 is applied to the core of the optical waveguide 1. This will increase the equivalent refractive index of the optical waveguide 1. This increasing tendency of the refractive index counteracts the decreasing tendency of the equivalent refractive index associated with the decrease in the refractive index by the thermal hysteresis phenomenon of the over cladding layer 7. The dominant factor is determined by the thickness of the over cladding layer 7 or by the degree of heating, and in this embodiment, the effect of stress was greater than that of thermal hysteresis phenomenon. Thus, the optical path length was elongated by about 0.75 $\mu$m. In either case, the optical path length of the waveguide 1 can be controlled by heating the region 13 with the heat-resistant heater 15: thus, the optical wavelength of the optical waveguide can be adjusted with passing a monitor light beam through the optical waveguide 1.

Incidentally, the stress from the silicon substrate 9 can be inhibited to a minimum amount by digging a stress releasing groove to such a depth as reaching the silicon substrate at either side of the optical waveguide beforehand (see the above-mentioned reference: Masao Kawachi, "Silica-based optical waveguides and their application to integrated optical devices", Optics 18, (1989), pp. 681-686). The stress can also be reduced by replacing the silicon substrate 9 of the present embodiment with a silica glass substrate.

In the optical path length control of the present embodiment, the thermal hysteresis phenomenon can be canceled by reheating the entire sample to about 1,000° C. and subsequently by cooling it slowly at a rate of $-10^{-2}$° C./sec as in the above embodiments.

Although the heat-resistant heater is used as a heating means in this embodiment, a $CO_2$ laser beam can also be used as a heating means as in the embodiment 6.

EMBODIMENT 8

Figure 25:
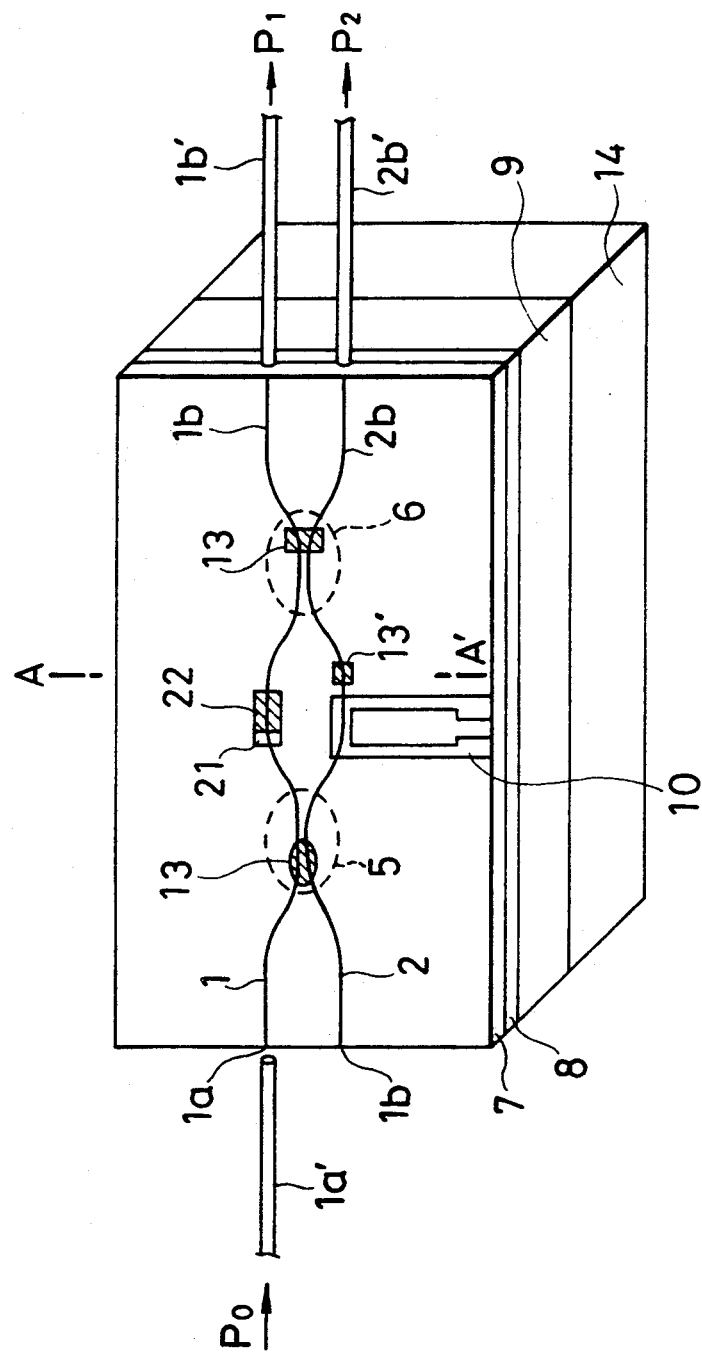
FIGS. 25 and 26 are a perspective view and an enlarged sectional view taken along line A—A' of FIG. 25, respectively, showing a guided-wave type polarization beam splitter and its characteristic adjusting method as an eight embodiment of the present invention.
Figure 26:
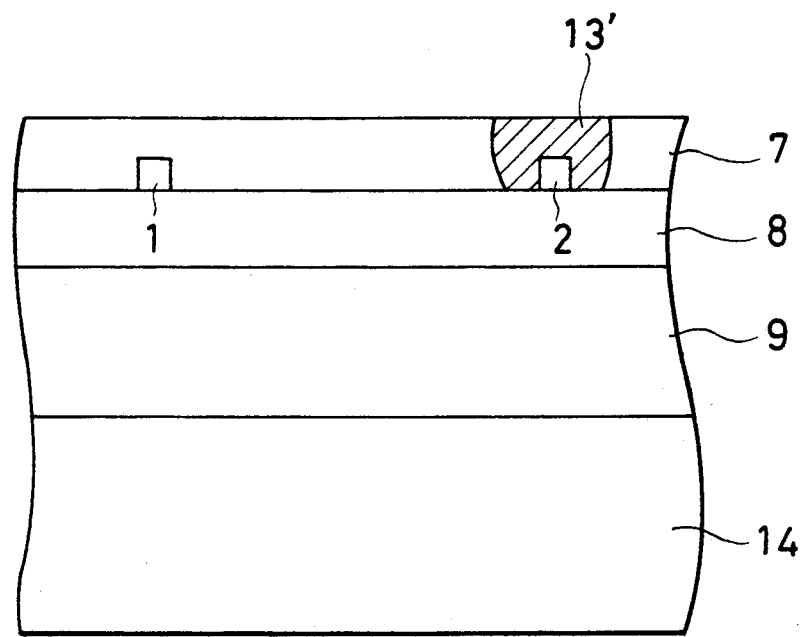

FIGS. 25 and 26 are a perspective view and an enlarged sectional view taken along line A—A' of FIG. 25, respectively, showing a guided-wave type polarization beam splitter according to an eighth embodiment of the present invention. Here, reference numeral 10 designates a thin film heater phase shifter, $P_0$, a power of an input light beam supplied to an input port 1a, $P_1$ and $P_2$, powers of output light beams emitted from output ports 1b and 2b, respectively. The sample used in the present embodiment is fabricated in such a method as that of the first embodiment, and comprises two directional couplers 5 and 6, and two waveguides 1 and 2 of equal length connecting the two directional couplers. The coupling ratios of the two directional couplers are set so that both of them range within 55±5%.

Next, the adjusting procedure of the polarization beam splitter will be explained.

(1) First, the coupling ratios of the two directional couplers 5 and 6 are adjusted to 50% by the thermal hysteresis method described in the sixth embodiment.

(2) A birefringence value of the waveguide 1 is adjusted by trimming an amorphous silicon stress applying film 21.

(3) The control of the optical path length difference between the waveguides 1 and 2 by the thin film heater phase shifter 10 is replaced with the control of the optical path length difference by the thermal hysteresis method described in the seventh embodiment so that a thermal hysteresis produced region 13' is formed.

As a result, a guided-wave polarization beam splitter is implemented wherein the continuous power supply to the thin film heater phase shifter 10 is unnecessary, which was essential before.

The above procedure will be described in more detail.

(1) First, the step for adjusting the coupling ratios of the two directional couplers 5 and 6 constituting the Mach-Zehnder interferometer to 50% by the thermal hysteresis method will be described.

The initial coupling ratios of the directional couplers 5 and 6 of FIG. 25 before the adjustment are assumed to be 50+$\alpha$%, and 50+$\beta$%, respectively, where $\alpha$, $\beta \geq 0$. In addition, the optical path length L1 of the waveguide 1 between the directional couplers 5 and 6 is assumed to be $$L1 = (n\pi + \phi + \theta) \lambda / 2\pi$$

Likewise, the optical path length L2 of the waveguide 2 between the directional couplers 5 and 6 is assumed to be $$L2 = (n\pi + \phi - \theta) \lambda / 2\pi$$

where, $\phi$ and $\theta$ are values satisfying the conditions of $0 \leq \phi < \pi$ and $0 \leq \theta < \pi/2$, respectively, and $\lambda$ is a wavelength of the light wave present in the waveguides 1 and 2.

When a TE mode wave of power $P_0$ is supplied to the input port 1a, the output powers $P_1$ and $P_2$ from the output ports 1b and 2b, respectively, can be expressed as follows:

$$P_1 = P_0 \{(+b)^2 - 4ab \cos^2 \theta\} \quad (1)$$

$$P_1 = P_0 \{(c-d)^2 + 4cd \cos^2 \theta\} \quad (2)$$

where:

$$a = \frac{1}{100} \sqrt{(50 - \alpha)(50 - \beta)}$$

$$b = \frac{1}{100} \sqrt{(50 + \alpha)(50 + \beta)}$$

$$c = \frac{1}{100} \sqrt{(50 + \alpha)(50 - \beta)}$$

$$d = \frac{1}{100} \sqrt{(50 - \alpha)(50 + \beta)}$$

If the optical wavelength of the waveguide 2 is adjusted by the thin film heater phase shifter 10 so that the power $P_1$ takes a minimum value, $P_1$ assumes the minimum value $P_1(n\pi)$ when $\theta=n\pi$ as is seen from equation (1).

$$P_1(n\pi) = P_0 \left( \frac{1}{2} + 2 \cdot \frac{\alpha}{100} \cdot \frac{\beta}{100} - 2\sqrt{\left(\frac{1}{4} - \left(\frac{\alpha}{100}\right)^2\right)\left(\frac{1}{4} - \left(\frac{\beta}{100}\right)^2\right)} \right)$$

Similarly, if the thin film heater phase shifter 10 is controlled so that the power $P_2$ takes a minimum value, $P_2$ assumes the minimum value $P_2((n+\frac{1}{2})\pi)$ when $\theta=(n+\frac{1}{2})\pi$.

$$P_2\left(\left(n+\frac{1}{2}\right)\pi\right) = P_0 \left( \frac{1}{2} + 2 \cdot \frac{\alpha}{100} \cdot \frac{\beta}{100} - 2\sqrt{\left(\frac{1}{4} - \left(\frac{\beta}{100}\right)^2\right)\left(\frac{1}{4} - \left(\frac{\beta}{100}\right)^2\right)} \right)$$

Then, $P_1(n\pi) - P_2((n+\frac{1}{2})\pi) = 4 \cdot P_0 \cdot (\alpha/100) \cdot (\beta/100)$ is made zero. In other words, the coupling ratio of the directional coupler 5 is adjusted by the method of the sixth embodiment, in which $CO_2$ laser beam is used for heating the thermal hysteresis produced region 13 of the directional coupler 5, so that the output powers $P_1$ and $P_2$ from the output ports 1b and 2b become equal. As a result, $\alpha=0$ is achieved. In this condition, the minimum value $P_1(n\pi)$ of the power $P_1$ is expressed by the following equation.

$$P_1(n\pi) = P_0\left(\frac{1}{2} - \sqrt{\frac{1}{4} - \left(\frac{\beta}{100}\right)^2}\right) \approx P_0\left(\frac{\beta}{100}\right)^2$$

Hence, when the coupling ratio of the directional coupler 6 is adjusted so that the minimum value $P_1(n\pi)$ is made zero by using the method described in the sixth embodiment, $\alpha=\beta=0$ can be achieved. Thus, the coupling ratios of the two directional couplers constituting the Mach-Zehnder interferometer of FIG. 25 can be tuned to 50%.

(2) Next, the method for controlling the birefringence value of the waveguide 1 by trimming the amorphous silicon stress applying film 21 will be described. This method has been disclosed in Japanese Patent Application Laying-Open No. 64-77002.

First, the principle of the method is described. The optical path length of the waveguide 1 connecting the directional couplers 5 and 6 takes different values for a TE mode wave and a TM mode wave: the optical path length for the TE mode wave is designated by $L_{1TE}$, and that for the TM mode wave is denoted by $L_{1TM}$.

Likewise, the two optical path lengths of the waveguide 2 connecting the directional couplers 5 and 6 are denoted by $L_{2TE}$, and $L_{2TM}$. Here, the difference between $\Delta L_{TE}(=L_{1TE}-L_{2TE})$ and $\Delta L_{TM}(=L_{1TE}-L_{2TE})$ is adjusted by controlling the birefringence so that the following equation is satisfied.

$$|\Delta L_{TE} - \Delta L_{TM}| = (n+\frac{1}{2})\lambda$$

where $\lambda$ is the wavelength of the input light beam. As a result, under a particular drive condition of the thin film heater phase shifter 10, the TE mode wave incident onto the input port 1a is outputted from the output port 1b, and the TM mode wave incident onto the input port 1a is outputted from the output port 2b, for example.

Figure 27:
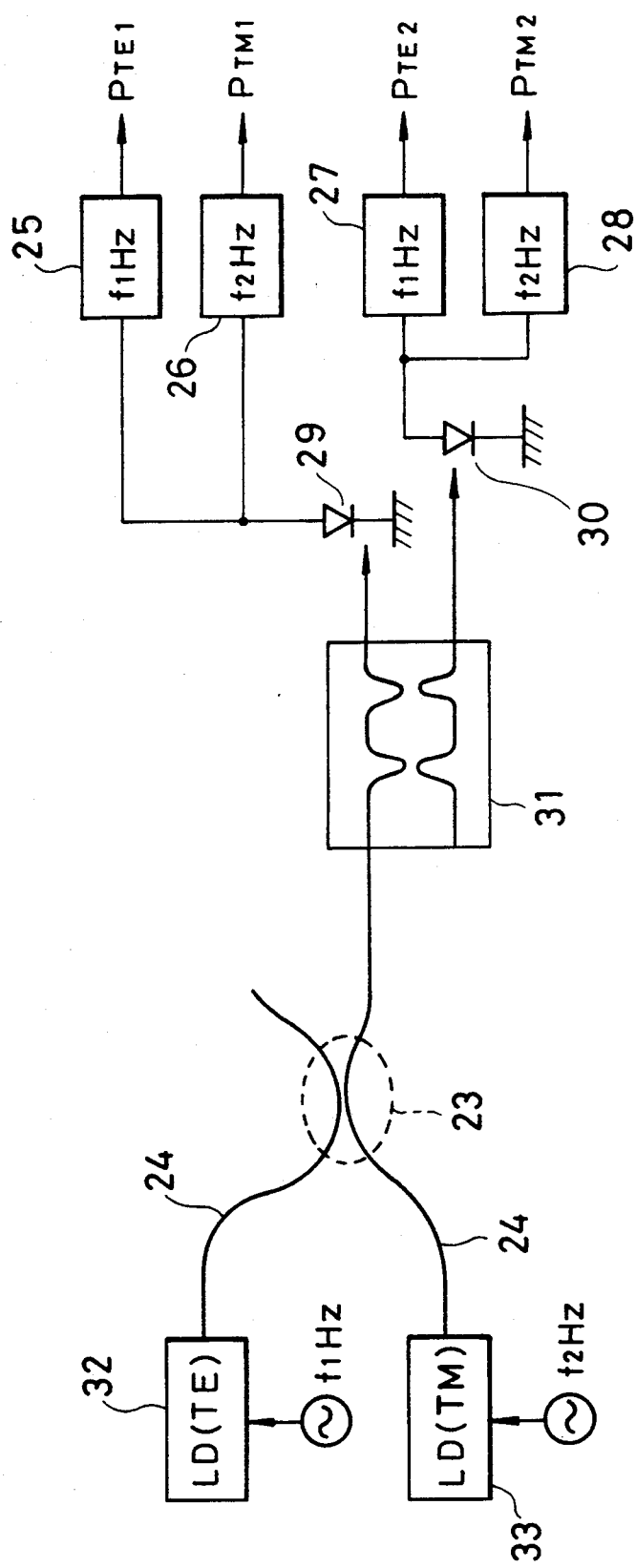
FIG. 27 is a block diagram showing the arrangement of a monitor system used for trimming the amorphous stress applying film so as to adjust the birefringence value of the eighth embodiment.

The adjusting method thereof will be described in more detail. FIG. 27 shows the arrangement of a system used to adjust the birefringence value of the present embodiment.

Here, reference numeral 31 designates a guided-wave polarization beam splitter to be adjusted, 29 and 30, photo detector devices such as phototransistors which receive and convert the output light beams from the polarization beam splitter 31 into electric signals, 23, a polarization maintaining fiber coupler, and 24, a polarization maintaining fiber. The TE mode wave LD(TE) from a laser diode 32 and the TM mode wave LD(TM) from a laser diode 33 undergo intensity modulation with frequencies of $f_1$ Hz and $f_2$ Hz, respectively. Two lock-in amplifiers (band-pass filters) 25 and 27 connected to the photo detector devices 29 and 30 synchronize with the frequency $f_1$ Hz, whereas the other two lock-in amplifiers (band-pass filters) 26 and 28 connected to the photo detector devices 29 and 30 synchronize with the frequency $f_2$ Hz. The outputs of the lock-in amplifiers 25-28 are represented by $P_{TE1}$, $P_{TM1}$, $P_{TE2}$ and $P_{TM2}$, respectively, which are detected, for example, by a measuring instrument or an operation circuit not shown.

With such an arrangement, the thin film heater phase shifter 10 of FIG. 25 is driven so that $\log (P_{TE2}/P_{TE1})$ takes a minimum value, or the difference between $P_{TE2}$ and $P_{TE1}$ becomes maximum.

Next, the amorphous silicon stress applying film 21 is being trimmed by an Ar laser so that $\log (P_{TM1}/P_{TM2})$ takes a minimum value, or the difference between $P_{TE2}$ and $P_{TE1}$ becomes maximum. In the course of this, since the drive condition of the heater for minimizing $\log (P_{TE2}/P_{TE1})$ changes in accordance with the trimming process, the drive current of the thin film heater phase shifter 10 is finely changed so that the drive current can follow the change. As a result, under a particular drive condition of the thin film heater phase shifter 10, the polarization beam splitter has very small crosstalk.

(3) Finally, the method for substituting the optical path length adjustment by using the thermal hysteresis method for the optical path length adjustment by using the thin film heater phase shifter 10 will be described.

The thin film heater phase shifter 10 is driven so that the polarization beam splitter 31 which has been adjusted by the steps above presents the minimum of $\log (P_{TE2}/P_{TE1})$. In addition, the region 13' shown in FIG. 25 is heated by the $CO_2$ laser, followed by the rapid cooling as in the sixth embodiment, thereby adjusting the optical path length of the waveguide 2. By this heat treatment, that is, by gradually heating and rapidly cooling the thermal hysteresis phenomenon produced region 13', the value of $\log (P_{TE2}/P_{TE1})$ can be minimized within $\lambda$ which is the changing range of the optical path length, with supplying no power to the thin film heater phase shifter 10. In this case, the optical path length difference beyond $\lambda$ is effectively identical to a one within the range of $\lambda$, because the optical path length difference $n\lambda$ is equivalently zero.

Thus, the polarization beam splitter is obtained in which no continuous power supply is needed, and which has very small crosstalk.

In practice, a polarization beam splitter is implemented wherein the crosstalk is −31 dB (with regard to the output power $P_{1TM/TE}$) and −28 dB (with regard to the output power $P_{2TM/TE}$), and no continuous power supply is needed.

EMBODIMENT 9

Figure 28:
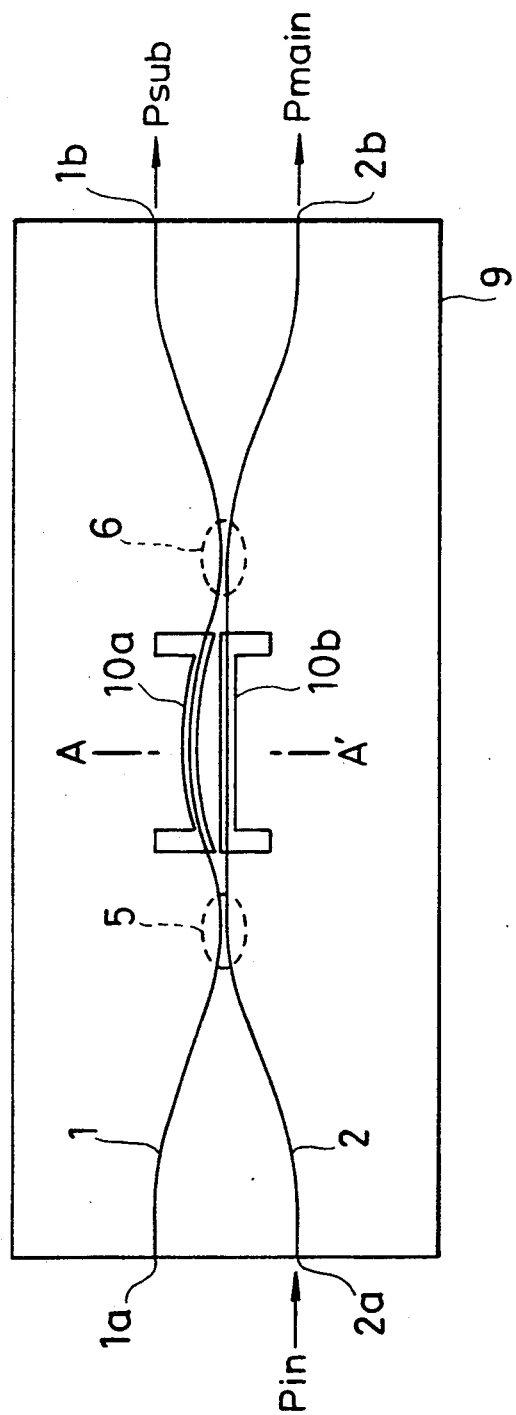
FIGS. 28 and 29 are plan view and an enlarged sectional view taken along line A—A' of FIG. 28, respectively, showing a guided-wave type wavelength independent coupler and its adjusting method as a ninth embodiment of the present invention.
Figure 29:
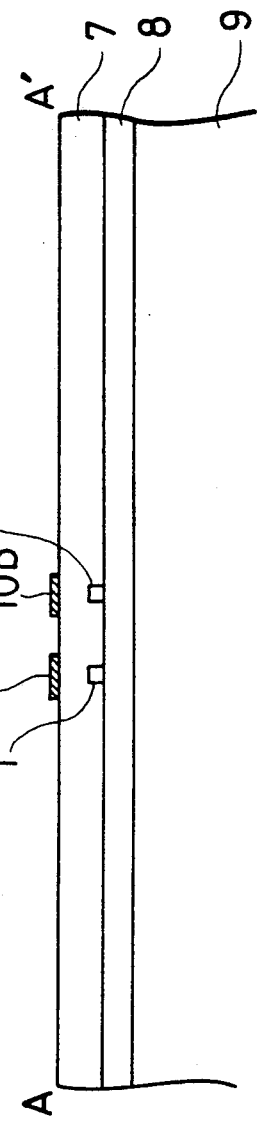

FIGS. 28 and 29 are a plan view and an enlarged sectional view taken along line A—A' of FIG. 28, respectively, showing a guided-wave type wavelength independent coupler according to a ninth embodiment of the present invention. The coupler has two optical waveguides 1 and 2, which are placed in close proximity at two positions on a substrate to form two directional couplers 5 and 6. On the two optical waveguides 1 and 2 connecting the two directional couplers 5 and 6, are disposed two heat-resistant heaters 10a and 10b. Designating the output power from output ports 1b and 2b by Psub and Pmain, respectively, the coupling ratio of the optical coupler the entire arrangement of which is shown in FIG. 28 can be expressed as follows:

Psub/(Pmain+Psub)

The wavelength dependence of the coupling ratio must be set as small as possible: to accomplish this, the effective optical path length difference between the optical waveguides connecting the two directional couplers is specified at approximately 0.9 μm (the basic principle of the coupler is disclosed in Japanese Patent Application No. 1-227449, 1989).

Figure 30:
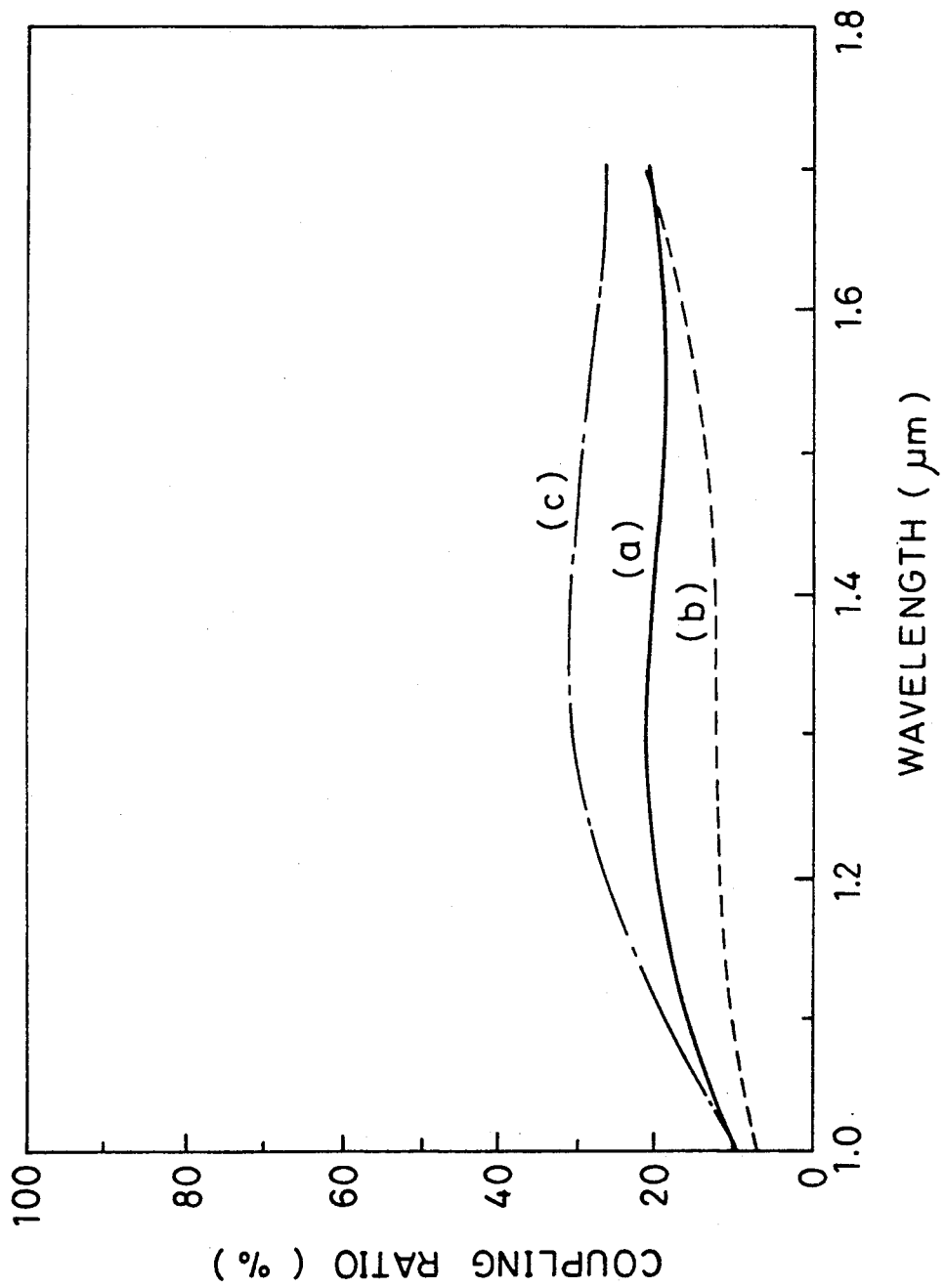
FIG. 30 is a characteristic diagram illustrating the relationship between the coupling ratio and the wavelength, which is obtained as results of an experiment for adjusting the coupling ratio of the coupler by the thermal hysteresis method using the heat-resistant heaters 10a and 10b in the ninth embodiment of the present invention.

FIG. 30 is a characteristic diagram illustrating the relationship between the coupling ratio and the wavelength for explaining examples of the adjustment of the coupling ratio of the coupler by using the heat-resistant heaters 10a and 10b. In FIG. 30, a solid line (a) shows the coupling ratio of the coupler before the heat-resistant heaters 10a and 10b are driven: a coupling ratio of approximately 20% is achieved in a wide range of 1.25–1.60 μm. The optical path length difference in this case is 0.9 μm as mentioned above.

Next, the optical path length difference is reduced to 0.8 μm by driving one of the two heat-resistant heaters 10a and 10b: the thermal hysteresis phenomenon of the optical path length control method described in the seventh embodiment is produced by heating the heat-resistant heater; and the wavelength characteristics shown by a broken line (b) is obtained. The coupling ratio is reduced to approximately 12% with maintaining the wavelength independence. In contrast with this, when the optical path length difference is increased to 1.0 μm, the wavelength characteristics shown by a dashed-and-dotted line (c) is obtained: the coupling ratio increases to about 28%.

The results of FIG. 30 show that the coupling ratio of the wavelength independent coupler can be finely adjusted by the optical path length adjustment of the present invention.

EMBODIMENT 10

Figure 31:
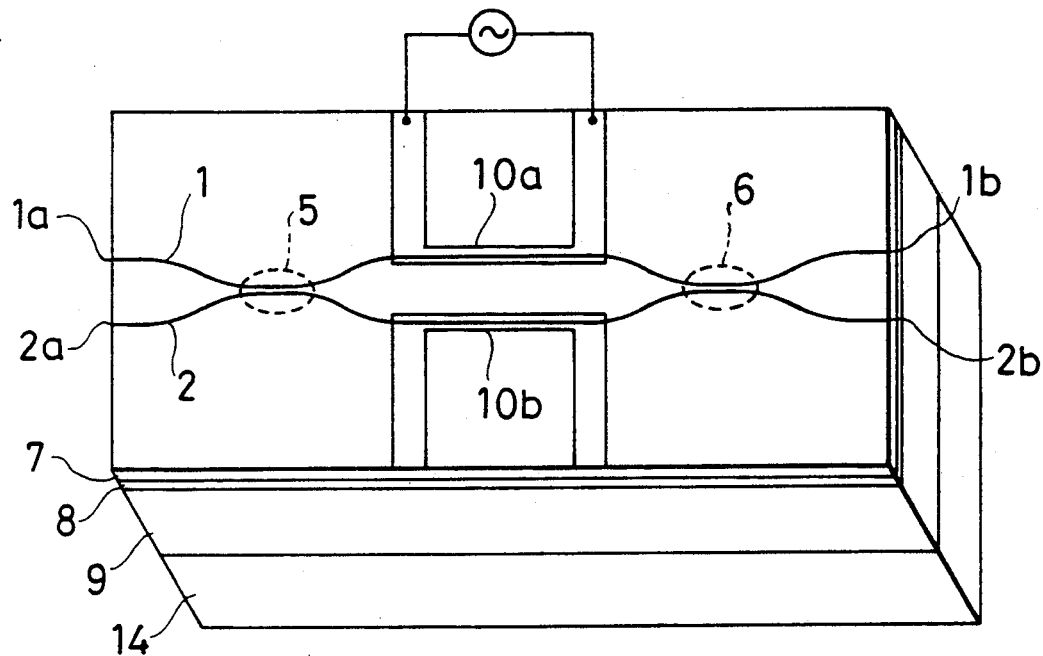
FIG. 31 is a perspective view showing an arrangement and adjusting method of an optical bistable switch as a tenth embodiment of the present invention.

FIG. 31 is a perspective view showing an optical bistable switch as a tenth embodiment of the present invention. A sample of the present embodiment is formed on a substrate 9 as in the ninth embodiment. The coupling ratios of two directional couplers 5 and 6 of the present embodiment are set at approximately 50% at the wavelength of 1.3 μm. Waveguides 1 and 2 connecting the directional couplers 5 and 6 have an equal optical path length: the optical path length difference between the two is set zero. On the optical waveguides 1 and 2, heat-resistant heaters 10a and 10b are disposed.

In the initial state where none of the heat-resistant heaters 10a and 10b are driven, the light signal the wavelength of which is 1.3 μm, and which is incident onto an input port 1a, is emitted from an output port 2b: in the initial state, the arrangement of FIG. 31 is in the cross mode (1a→2b, 2a→1b).

Next, when one of the heat-resistant heaters 10a and 10b is driven so that the optical path length of one of the waveguides 1 and 2 is increased by one-half wavelength or 0.65 μm (=1.3 μm/2) as a result of the thermal hysteresis phenomenon previously described, the arrangement of FIG. 31 changes to the through mode (1a→1b, 2a→2b). The two modes can be alternately switched by subjecting the heat-resistant heater 10a or 10b to the heating operation, followed by rapid cooling or of heating followed by slow cooling. Thus the sample of the embodiment functions as an optical bistable switch. Although this switch is not suitable for such applications in which the optical paths are quickly switched because of the principle of its operation, it can be advantageously used in such applications where switching takes place only several times a year.

EMBODIMENT 11

Figure 32:
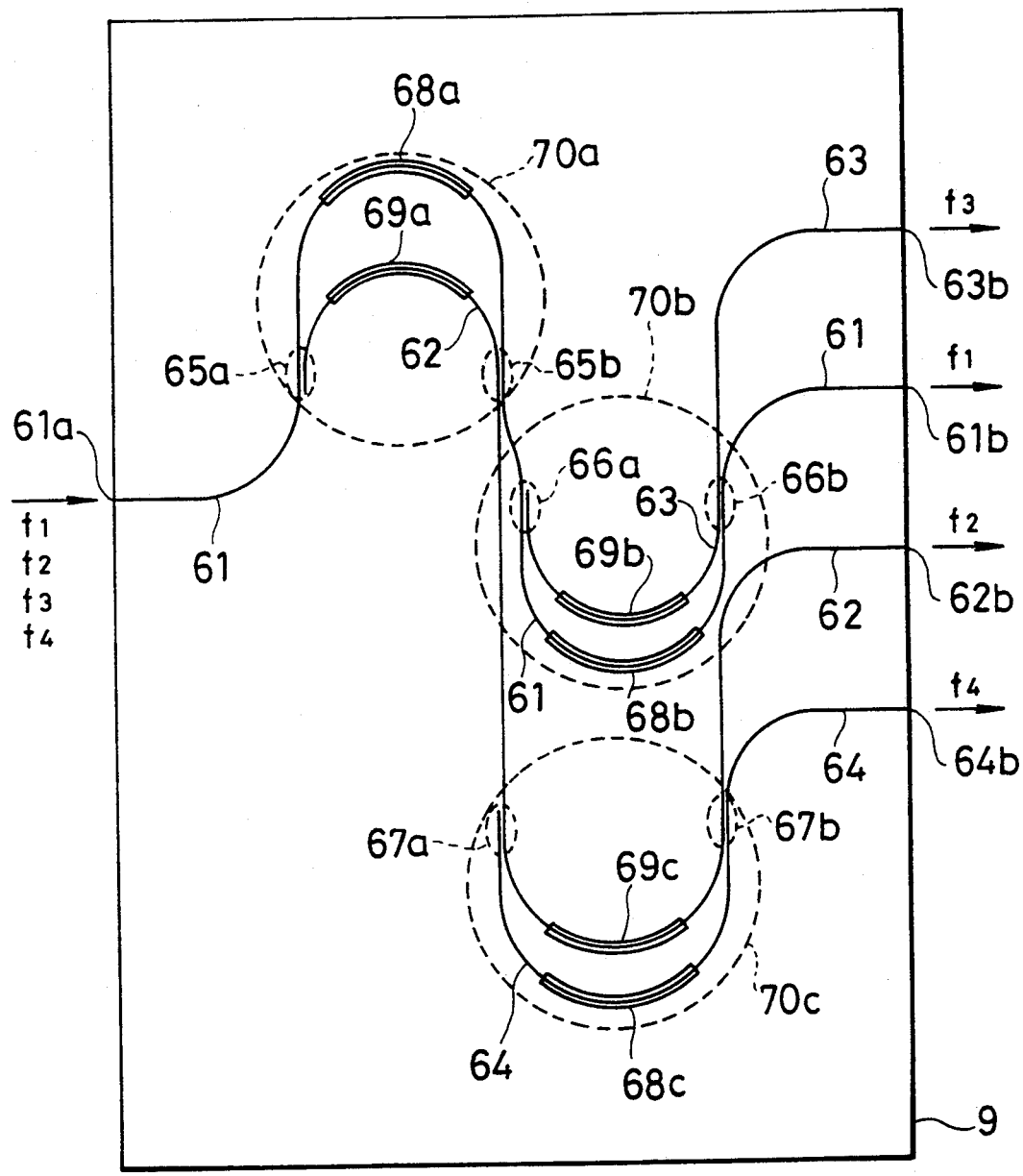
FIG. 32 is a plan view showing an optical frequency-division multi/demultiplexing device and its adjusting method as an eleventh embodiment of the present invention.

FIG. 32 is a plan view showing an optical frequency-division multi-demultiplexing device as an eleventh embodiment of the present invention. In FIG. 32, reference numerals 61–64 designate optical waveguides formed on a silicon substrate 9 by a process similar to that of the first embodiment. The cross sectional dimensions of the cores are 6 μm×6 μm, and the relative refractive index difference between the cores and cladding layers surrounding them is 0.75%. The optical waveguides 61 and 62 approach each other at two places on the silicon substrate 9 to form directional couplers 65a and 65b. The optical waveguides 61 and 62 connecting the directional couplers 65a and 65b have the shape of a curve the radius of curvature of which is about 5 mm so that the waveguide length difference of ΔL=10 mm is set between the directional couplers 65a and 65b, thus constituting, as a whole, an asymmetric Mach-Zehnder interferometer 70a.

Likewise, the optical waveguides 61 and 63 constitute an asymmetric Mach-Zehnder interferometer 70b including directional couplers 66a and 66b, and the optical waveguides 62 and 64 constitute an asymmetric Mach-Zehnder interferometer 70c including directional couplers 67a and 67b. The waveguide length differences between the two directional couplers of the asymmetric Mach-Zehnder interferometers 70b and 70c are set at ΔL/2=5 mm.

The three asymmetric Mach-Zehnder interferometers 70a, 70b and 70c have amorphous silicon stress applying films 68a, 68b and 68c disposed on one of the two optical waveguides thereof, respectively, for controlling the birefringence of the optical waveguides, and have heat-resistant heaters 69a, 69b and 69c disposed on the other waveguide of the two optical waveguides thereof, respectively.

Next, the procedure for adjusting the characteristics of the optical frequency-division multi-demultiplexing device will be described.

(1) First, the polarization dependence of the asymmetric Mach-Zehnder interferometers 70a, 70b and 70c are eliminated by laser trimming the amorphous silicon stress applying film 68a, 68b and 68c (see Japanese patent application laying-open 64-77002).

(2) Second, the path length differences of the waveguides of the asymmetric Mach-Zehnder interferometers 70a, 70b and 70c are finely adjusted by driving the heat-resistant heaters 69a, 69b and 69c so that the optical frequency responses of the asymmetric Mach-Zehnder interferometers 70a, 70b and 70c are tuned with the 4-channel light signals $f_1$, $f_2$, $f_3$ and $f_4$ which are spaced $\Delta f = 10$ GHz apart.

Figure 33A:
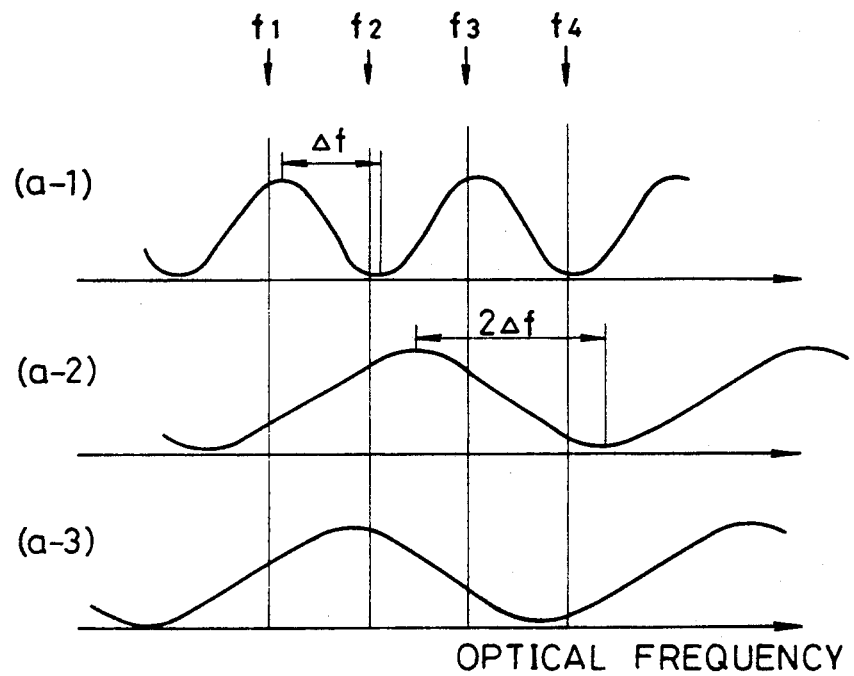
FIGS. 33A and 33B are diagrams illustrating an adjusting method of optical frequency response characteristics of the asymmetric Mach-Zehnder interferometers 70a, 70b and 70c by the thermal hysteresis method using heat-resistant heaters in the eleventh embodiment of the present invention.
Figure 33B:
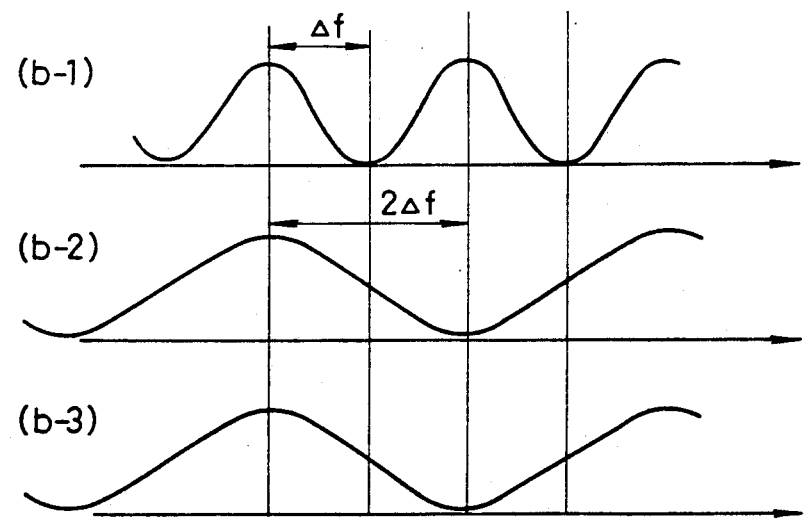

FIGS. 33A and 33B are diagrams showing optical frequency response characteristics of the asymmetric Mach-Zehnder interferometers 70a, 70b and 70c. Step (2) above will be described in more detail with reference to this figure.

In FIG. 33A, (a-1) shows the optical frequency response characteristics of the asymmetric Mach-Zehnder interferometer 70a after step (1) above has been completed: the space between the peak and bottom of the optical frequency response which exhibits a sinusoidal shape based on the interference principle, is set at $\Delta f$ (= 10 GHz) which in turn is defined by the path length difference $\Delta L$ (= 10 mm) of the waveguides 61 and 62. The absolute optical frequency positions of the peaks and bottoms, however, are not constant because the refractive indices of the waveguides and the optical path lengths thereof have slight random errors. To correctly operate the optical multi-demultiplexing device of FIG. 32, the heat-resistant heater 69a must be used, and the optical path length of the waveguide thereunder must be finely adjusted in the submicron precision so that the asymmetric Mach-Zehnder interferometer 70a assumes the optical frequency response characteristics as shown in (b-1) of FIG. 33B at operation temperatures of the multi/demultiplexing device: for example, at the operation temperature of 25° C., the optical frequency response of (a-1) of FIG. 33A is shifted in the direction of the axis of the optical frequency so that the peak positions correspond to the frequencies $f_1$ and $f_3$, and the bottom positions correspond to the frequencies $f_2$ and $f_4$ as shown in (b-1) of FIG. 33B.

Similarly, by using the heat-resistant heaters 69b and 69c, the optical frequency response characteristics (the space between the peak and bottom of which is $2\Delta f = 20$ GHz) of the asymmetric Mach-Zehnder interferometers 70b and 70c shown in (a-2) and (a-3) of FIG. 33A are precisely aligned as shown in (b-2) and (b-3) of FIG. 33B.

After the operation of the alignment by using the thermal hysteresis phenomenon, the 4-channel light signals $f_1$, $f_2$, $f_3$ and $f_4$, each spaced $\Delta f$ (= 10 GHz) apart, and supplied to an input port 61a, can be emitted from output ports 61b, 62b, 63b and 64b, respectively, thus accomplishing the intended operation.

It is clear that, once the operation of the alignment has been accomplished, the power supply to the heat-resistant heaters 69a, 69b and 69c is unnecessary as long as the operation temperature is maintained at 25° C.

The present embodiment is explained in connection with the 4-channel optical frequency-division multi/demultiplexing device. A similar arrangement can be further applied to an 8-channel or 16-channel optical multi/demultiplexing devices which connect the asymmetric Mach-Zehnder interferometers in multiple stages.

Although specific embodiments of a guided-wave optical circuit and method for adjusting a characteristic thereof of the present invention have been disclosed, it is not intended that the invention be restricted to either the specific configurations or the uses disclosed herein. Modifications may be made in a manner obvious to those skilled in the art as follows, for example:

Although the present invention is described in connection with the silica-based guided-wave optical circuits formed on a silica-based glass substrate or on a silicon substrate, optical waveguide material other than the silica-based glass can be used: for example, fluoride glass, multicomponent glass, or the like, wherein the thermal hysteresis phenomenon can be induced, can be used.

Although the present invention is described with regard to embodiments of the directional couplers, polarization beam splitter, optical bistable switch, wavelength independent coupler, and optical frequency-division multi/demultiplexing device, other similar guided-wave optical circuits such as a thermo-optical type matrix switch, optical ring resonator, wavelength-division multi/demultiplexing device, various types of optical filters, or the like.

Accordingly, it is intended that the invention be limited only by the scope of the appended claims.

What is claimed is:

1. A method for adjusting a characteristic of a guided-wave optical circuit which includes one or more waveguides formed by a substrate, a cladding layer formed on said substrate, and a core portion having one or more cores embedded in said cladding layer, said method comprising the step of:

producing a reversible thermal hysteresis phenomenon, after said cladding layer and core portion have been formed, in a thermal hysteresis produced region preselected so as to include at least a portion of said cladding layer and/or said core portion, in order to produce a predetermined difference between the refractive index of said cladding layer and the refractive index of said core portion; said step of producing a reversible thermal hysteresis comprising the steps of:

raising the temperature of said thermal hysteresis produced region to a predetermined temperature;

maintaining the predetermined temperature of said thermal hysteresis produced region for a predetermined time period; and cooling said thermal hysteresis produced region at a predetermined cooling rate, wherein said step of producing a reversible thermal hysteresis phenomenon is repeated a plurality of times to adjust the characteristic of said guided-wave optical circuits.

2. A method for adjusting a characteristic of a guided-wave optical circuit as claimed in claim 1, wherein said predetermined cooling rate is determined at a greater value than a refractive index maintaining cooling rate at which the difference of the refractive indices between said cladding layer and core portion is maintained before and after the thermal hysteresis phenomenon.

3. A method for adjusting a characteristic of a guided-wave optical circuit as claimed in claim 1, wherein said step of producing a reversible thermal hysteresis phenomenon is carried out to change a coupling ratio between said waveguides of the guided-wave optical circuit.

4. A method for adjusting a characteristic of a guided-wave optical circuit as claimed in claim 3, wherein said guided-wave optical circuit is a directional coupler.

5. A method for adjusting a characteristic of a guided-wave optical circuit as claimed in claim 1, wherein said step of producing a reversible thermal hysteresis phenomenon is carried out to change an optical path length of at least one of said waveguides of the guided-wave optical circuit.

6. A method for adjusting a characteristic of a guided-wave optical circuit as claimed in claim 5, wherein said guided-wave optical circuit is an optical interferometer.

7. A method for adjusting a characteristic of a guided-wave optical circuit as claimed in claim 1, wherein said thermal hysteresis produced region includes said substrate, said cladding layer and said core portion, and said step of producing a reversible thermal hysteresis phenomenon is carried out at the same time to all the guided-wave optical circuits which have been formed on said substrate, thereby to adjust the characteristic of all the guided-wave optical circuits on said substrate.

8. A method for adjusting a characteristic of a guided-wave optical circuit as claimed in claim 1, wherein said thermal hysteresis produced region is a portion of said cladding layer and/or of said core portion.

9. A method for adjusting a characteristic of a guided-wave optical circuit as claimed in claim 8, wherein said step of producing a reversible thermal hysteresis phenomenon is carried out by irradiating said thermal hysteresis produced region by an energy beam.

10. A method for adjusting a characteristic of a guided-wave optical circuit as claimed in claim 8, wherein said steps of producing a reversible thermal hysteresis phenomenon is carried out by using a heater for heating said thermal hysteresis produced region.

11. A method for adjusting a characteristic of a guided-wave optical circuit as claimed in claim 1, wherein said step of producing a reversible thermal hysteresis phenomenon is repeated a plurality of times to adjust the characteristic of said guided-wave optical circuits.

12. A method for adjusting a characteristic of a guided-wave optical circuit as claimed in claim 1, wherein said step of producing a reversible thermal hysteresis phenomenon is carried out to said cladding layer and said core portion which have different dopant concentrations, so that thermal expansion coefficients of said cladding layer and said cores of said core portion differ each other.

13. A method for adjusting a characteristic of a guided-wave optical circuit as claimed in claim 12, wherein said cladding layer has greater dopant concentration than said core portion.

14. A method for adjusting a characteristic of a guided-wave optical circuit as claimed in claim 12, wherein said core portion has greater dopant concentration than said cladding layer.

15. A guided-wave optical circuit comprising:
one or more waveguides formed by a substrate, a cladding layer formed on said substrate, and a core portion having one or more cores embedded in said cladding layer; and
a thermal hysteresis produced region which is preselected so as to include at least a portion of said cladding layer and/or said core portion, said cladding layer and said core portion having a predetermined difference in refractive index, said difference having been produced by a reversible thermal hysteresis phenomenon so that the refractive index difference in the thermal hysteresis produced region differs from that of a region other than the thermal hysteresis produced region.

16. A guided-wave optical circuit comprising:
one or more waveguides formed by a substrate, a cladding layer formed on said substrate, and a core portion having one or more cores embedded in said cladding layer;
a thermal hysteresis produced region which is preselected so as to include at least a portion of said cladding layer and/or said core portion, said cladding layer and said core portion having a predetermined difference in refractive index, said difference having been produced by a reversible thermal hysteresis phenomenon so that the refractive index difference in the thermal hysteresis produced region differs from that of a region other than the thermal hysteresis produced region; and
means for producing the reversible thermal hysteresis phenomenon in said thermal hysteresis produced region after said cladding layer and core portion have been formed, thereby adjusting the refractive index difference.

17. A guided-wave optical circuit as claimed in claim 16, wherein said guided-wave optical circuit includes a directional coupler, and said means for producing the reversible thermal hysteresis phenomenon is one or more heaters, each of which is disposed in the vicinity of said directional coupler, for changing the coupling ratio of said directional coupler.

18. A guided-wave optical circuit as claimed in claim 17, wherein said one or more heaters are covered by a protective film.

19. A guided-wave optical circuit as claimed in claim 17, wherein said substrate has a heat insulating groove for preventing heat developed by said heaters from dispersing.

20. A guided-wave optical circuit as claimed in claim 16, wherein said means for producing the reversible thermal hysteresis phenomenon is one or more heaters disposed on said cladding layer for heating said thermal hysteresis produced region, thereby to change an optical path length of at least one of said waveguides of said guided-wave optical circuit.

21. A guided-wave optical circuit as claimed in claim 20, wherein said guided-wave optical circuit includes a plurality of directional couplers and waveguides connecting said directional couplers, and said one or more heaters are disposed in the vicinity of at least one of said waveguides.

22. A guided-wave optical circuit as claimed in claim 21, further comprising a stress applying film disposed in the vicinity of at least one of said waveguides for exerting a stress on said waveguide.

23. A guided-wave optical circuit as claimed in claim 21, wherein said waveguides connecting said directional couplers have different optical path lengths, and each of said heaters is disposed in the vicinity of each respective one of said waveguides.

24. A guided-wave optical circuit as claimed in claim 21, wherein said waveguides connecting said directional couplers have the same optical path length, and each of said heaters is disposed in the vicinity of each respective one of said waveguides.

25. A guided-wave optical circuit as claimed in claim 21, wherein said guided-wave optical circuit includes a plurality of directional couplers and waveguides connecting said directional couplers, said directional couplers and waveguides being arranged into an optical multiplexer, and said one or more heaters are disposed in the vicinity of said waveguides.

26. A guided-wave optical circuit as claimed in claim 16, wherein said cladding layer consists of an over cladding layer and a under cladding layer, and said over cladding layer has greater dopant concentration than said under cladding layer and said core portion.

27. A guided-wave optical circuit as claimed in claim 16, wherein said cladding layer consists of an over cladding layer and a under cladding layer, and said core portion has greater dopant concentration than said over cladding layer and said under cladding layer.

* * * * *